(12) United States Patent
Okabe et al.

(10) Patent No.: US 7,499,135 B2
(45) Date of Patent: Mar. 3, 2009

(54) LIQUID CRYSTAL DISPLAY

(75) Inventors: Masato Okabe, Tokyo (JP); Naoko Sawatari, Tokyo (JP); Makoto Ishikawa, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 516 days.

(21) Appl. No.: 11/148,826

(22) Filed: Jun. 9, 2005

(65) Prior Publication Data
US 2006/0083865 A1 Apr. 20, 2006

(30) Foreign Application Priority Data
Jun. 11, 2004 (JP) .............................. 2004-174796

(51) Int. Cl.
 G02F 1/141 (2006.01)
 G02F 1/1337 (2006.01)
(52) U.S. Cl. .................... 349/135; 349/123; 349/133
(58) Field of Classification Search .......... 349/123–135
See application file for complete search history.

(56) References Cited

U.S. PATENT DOCUMENTS 5,818,557 A * 10/1998 Konuma et al. ............... 349/93
6,411,354 B1 * 6/2002 Lavrentovich et al. ........ 349/84
2006/0038949 A1 * 2/2006 Okabe et al. ................. 349/133

FOREIGN PATENT DOCUMENTS

JP        2006-58518        * 3/2006

OTHER PUBLICATIONS

Nonaka, T., Li J., Ogawa, A., Hornung, B., Schmidt, W., Wingen, R., and Dubal, H., Liquid Crystals, 1999, vol. 26, No. 11, 1599-1602, Material charcateristics of an active matrix LCD based upon chiral smectics.
Patel, J., and Goodby, J.W., 1986 J. Appl. Phys., 59, (7), 2355-2360, Alignment of liquid crystals which exhibit cholesteric to smectic C* phase transitions.

* cited by examiner

Primary Examiner—Dung T. Nguyen
(74) Attorney, Agent, or Firm—Ladas & Parry LLP

(57) ABSTRACT

A method of controlling the alignment of a ferroelectric liquid crystal without the need of an alignment process, such as a rubbing process and a photo alignment process, in a liquid crystal display using a ferroelectric liquid crystal. The method uses a columnar alignment layer having a column structure with a plate-like molecule having photo dichroism in the visible light range as one of the alignment layers for controlling the alignment of the ferroelectric liquid crystal. The method forms a reactive liquid crystal layer produced by fixing a reactive liquid crystal including a polymerizable liquid crystal material on the side to be contacted with the ferroelectric liquid crystal on the columnar alignment layer, showing the nematic phase on the columnar alignment layer.

14 Claims, 3 Drawing Sheets

LIQUID CRYSTAL DISPLAY

BACKGROUND OF THE INVENTION

1. Field of the Invention

The present invention relates to liquid crystal display using ferroelectric liquid crystal.

2. Description of the Related Art

Since liquid crystal display has features that it is thin and is low in power consumption and other features, the use has been expanding in various articles from large-sized displays to portable information terminals and the development has been actively made. Conventionally, for liquid crystal display, a TN system, an STN multiplex driving system, an active matrix driving system in which thin film transistor (hereinafter, it may be referred to as "TFT element") are used in TN, and others have been developed and made practicable. However, nematic liquid crystal is used therein; therefore, the response speed of the liquid crystal material is as small as several milliseconds to several tens of milliseconds and it cannot be said that these sufficiently cope with display of moving images.

On the other hand, ferroelectric liquid crystal exhibits a very short response time in order of microseconds, thus ferroelectric liquid crystal is suitable for high-speed devices. As such ferroelectric liquid crystal, there is well known a bistable liquid crystal suggested by Clark and Lagerwall and which has two stable states when no voltage is applied thereto. However, the liquid crystal has a problem that the liquid crystal has memory property but graduation display cannot be attained since the switching thereof is limited to two states, namely, bright and dark states.

In recent years, attention has been paid to ferroelectric liquid crystal, in which the liquid crystal layer thereof is stable in a single state (hereinafter referred to as "monostable") when no voltage is applied thereto, as a liquid crystal which makes it possible to attain graduation display by the matter that the director (the inclination of the molecule axis) of the liquid crystal is continuously changed by a change in applied voltage so as to analogue-modulate the light transmission thereof (NONAKA, T., LI, J., OGAWA, A., HORNUNG, B., SCHMIDT, W., WINGEN, R., and DUBAL, H., 1999, Liq. Cryst., 26, 1599).

In general, as a method for having the mono-stability of the ferroelectric liquid crystal, there are a polymer stabilizing method for adding a ultraviolet curable monomer in he liquid crystal material, injecting into a cell, and curing so as to stabilize the alignment of the liquid crystal, or a method for raising the temperature of the ferroelectric liquid crystal to a temperature higher than the phase transition point, and then cooling down gradually.

However, according to the polymer stabilizing method, problems are involved in that the process is complicated, the driving voltage is high, or the like. Moreover, according to the latter method not using the polymer stabilizing method, two different domains in the layer normal direction (hereinafter it may also be referred to as the "double domains") can easily be formed so as to give rise to the grave problem of the display with the black and white inverted at the time of the drive. As to the double domains, although a method for having the mono domain by the electric field induced technique (, which uses DC voltage during cooling process) of gradually cooling while applying the voltage, is known (PATEL, J., and GOODBY, J. W., 1986, J. Appl. Phys., 59, 2355.), there is a problem of the alignment disturbance in the case the ferroelectric liquid crystal again has a temperature higher than the phase transition point, and thus the practical usability is low.

Moreover, as a technique for align the liquid crystal, there also are the rubbing process, the photo alignment method, or the like. According to the rubbing process, which provides the alignment ability by rubbing the polyimide-coated surface, it is difficult to have the evenness at the time of processing a large area, and moreover, there are the problems of generating the static electricity, the dusts, or the like. On the other hand, according to the photo alignment method, which provides the alignment ability by arranging the molecules in a specific direction by irradiating a compound having the photo alignment property with an ultraviolet ray, or the like, it is advantageous in that the quantitative alignment process can be controlled without generation of the static electricity or the dusts, however, a problem is involved in that the device cost is required due to the need of the exposing process.

On the other hand, such liquid crystal display comprises two alignment substrates having an electrode layer and an alignment layer on a substrate, so as to have the alignment layers face with each other, with the space between the alignment substrates filled with a liquid crystal. Furthermore, in general, a polarizing plate for changing an incident non polarized light beam to a linear polarized light beam is attached to the outside of the substrates.

Accordingly, since the liquid crystal display utilizes the birefringence effect, for the visualization, a polarizing plate is required. However, since the polarizing plate is attached to the outside of the substrate, scattering of the light is generated at the interface between the substrate and the polarizing plate so that a problem arises in that the light transmission can easily be lowered.

Moreover, recently, particularly for the usage in the portable terminal, or the like, miniaturization is demanded so that a thin shape and a light weight are required for the liquid crystal display. To meet this demand, in the case the thin shape and the lightweight are to be realized by changing the conventional glass substrate to a plastic substrate, since the polarization is disturbed by the birefringence of the plastic substrate, the substrate to be used is extremely limited and expensive. Moreover, although the display quality deterioration due to the birefringence of the substrate can be prevented by disposing a polarizing plate inside the substrate, since the conventional polarizing plate is produced in general by containing an iodine to a drawing alignment film, a problem is involved in that such a polarizing plate cannot be formed inside the substrate.

SUMMARY OF THE INVENTION

The present invention has been achieved in view of the problems. The main object is to control the alignment of the ferroelectric liquid crystal by a simple method without the need of an alignment process such as the rubbing process and the photo alignment process in a liquid crystal display using a ferroelectric liquid crystal, moreover, to better solve the light scattering generated at the interface between the polarizing, plate and the other functional layers compared with the case of separately providing the polarizing plate by the use of an alignment layer having the alignment function of controlling the alignment of the ferroelectric liquid crystal and the polarizing function of changing a non polarized light beam to a linear polarized light beam and thereby restrain the deterioration of the light transmittance, and furthermore, to achieve a thin shape and a light weight of the liquid crystal display.

In order to achieve the object, the present invention provides a liquid crystal display comprising a first alignment substrate having a first substrate, a first electrode layer formed on the first substrate and a first alignment layer formed on the first electrode layer, and a second alignment substrate having a second substrate, a second electrode layer formed on the second substrate, a second alignment layer formed on the second electrode layer, and a reactive liquid crystal layer formed on the second alignment layer, produced by fixing a reactive liquid crystal including a polymerizable liquid crystal material and showing the nematic phase; disposed such that the first alignment layer and the reactive liquid crystal layer face with each other, with a ferroelectric liquid crystal interposed between the first alignment substrate and the second alignment substrate; wherein the second alignment layer has a column structure a with plate-like molecule having a photo dichroism in a visible light range laminated with the normal direction of the plate-like molecule aligned in a certain direction, and it is a columnar alignment layer having the alignment function and the polarizing function.

According to the present invention, since the columnar alignment layer having the alignment function and the polarizing function is used as the second alignment layer, compared to the case of separately providing the polarizing plate, scattering of the light beam generated at the interface between the polarizing plate and the other functional layers can be solved better, and thereby the deterioration of the light transmission can be restrained. Moreover, since the columnar alignment layer having the polarizing function (second alignment layer) is formed inside the second substrate so as not to suffer the influence of the birefringence of the second substrate, a plastic substrate having the birefringence can also be used as the second substrate. Thus, a thin shape and a light weight of the liquid crystal display can be achieved to lead to the cutback of the production cost. Furthermore, since the columnar alignment layer used in the present invention is formed, utilizing the self organization of the plate-like molecule, it can be formed by a simple method without the need of the alignment process such as the rubbing process and the photo alignment process, and thus it is advantageous. Furthermore, according to the present invention, since the gap between the first alignment layer and the reactive liquid crystal layer is filled with the ferroelectric liquid crystal, generation of the alignment defect such as the double domains can be prevented so that the mono-domain alignment of the ferroelectric liquid crystal can be obtained.

According to the invention, it is preferable that the first alignment layer is the columnar alignment layer, and the normal direction of the plate-like molecule of the first alignment layer and the normal direction of the plate-like molecule of the second alignment layer are disposed substantially perpendicularly. Since the columnar alignment layer having the alignment function and the polarizing function is used as the first alignment layer, the deterioration of the light transmittance as mentioned above can be restrained. Moreover, since the columnar alignment layer having the polarizing function (first alignment layer) is formed inside the first substrate, the selection range of the material used for the first substrate can be widened so that a thin shape and a light weight of the liquid crystal display and the production cost cutback can be achieved. Furthermore, since the columnar alignment layer is formed, utilizing the self organization of the plate-like molecule, it can be formed by a simple method without the need of the alignment process such as the rubbing process and the photo alignment process.

Moreover, according to the present invention, it is preferable that the columnar alignment layer comprises a resin layer with a concave part or a convex part having a predetermined width formed on the surface in a pattern, and the column structure formed along the concave part of the resin layer.

Since the column structure is formed along the concave part of the resin layer, the column structure can be easily aligned in a certain direction.

Furthermore, according to the present invention, it is preferable that the plate-like molecule shows a lyotropic liquid crystal phase in an aqueous solution. Since the plate-like molecule forms a column structure in the aqueous solution by the self organization so as to show the lyotropic liquid crystal phase, by coating a columnar alignment layer forming coating solution containing the plate-like molecule, the column structure can be aligned easily. Moreover, since the plate-like molecule is water soluble, the fixing process for fixing the column structure can be facilitated.

Further, according to the invention, it is preferable that the ferroelectric liquid crystal shows the mono-stability driving characteristic. Since the ferroelectric liquid crystal shows the mono-stability driving characteristic, the graduation display can be enabled so that a highly precise liquid crystal display for the color display can be obtained.

Still further, in the invention, it is preferable that the ferroelectric liquid crystal shows a phase transition sequence without the smectic A phase in the temperature cooling process. A ferroelectric liquid crystal showing such a phase transition sequence tends to show the mono-stability driving characteristic, and by using such a ferroelectric liquid crystal, a highly precise liquid crystal display for the color display can easily be obtained.

Moreover, it is preferable that the invention comprises thin Film transistor (TFT element) in the first electrode layer or the second electrode layer of the active matrix drive. By adopting the active matrix system using TFT element, it becomes possible to switch on or off target pixels surely to give high-quality display.

Moreover, the invention is preferably driven by a field sequential color system for the following reason: the liquid crystal display of the present invention has a large response speed and makes it possible to align the ferroelectric liquid crystal therein without forming any alignment defect; therefore, when the display element is driven by the field sequential color system, bright and highly precise display of color moving images which has a wide field angle can be realized at low costs and low power consumption.

According to the present invention, since the columnar alignment layer is used for controlling the alignment of the ferroelectric liquid crystal, the ferroelectric liquid crystal can be aligned by a simple method without the need of the alignment process such as the rubbing process and the photo alignment process. Moreover, compared to the case of separately providing the polarizing plate, the scattering of the light beam generated at the interface between the polarizing plate and the other functional layers can be solved better, and thereby the deterioration of the light transmittance can be restrained. Furthermore, since the columnar alignment layer having the polarizing function is formed inside the substrate, the selection range of the material used for the substrate can be widened so that a thin shape and a light weight of the liquid crystal display, and furthermore, the production cost cutback can be achieved. Moreover, generation of the alignment defect such as the double domains can be prevented so that the mono-domain alignment of the ferroelectric liquid crystal can be obtained.

DESCRIPTION OF THE PREFERRED EMBODIMENT

Figure 1:
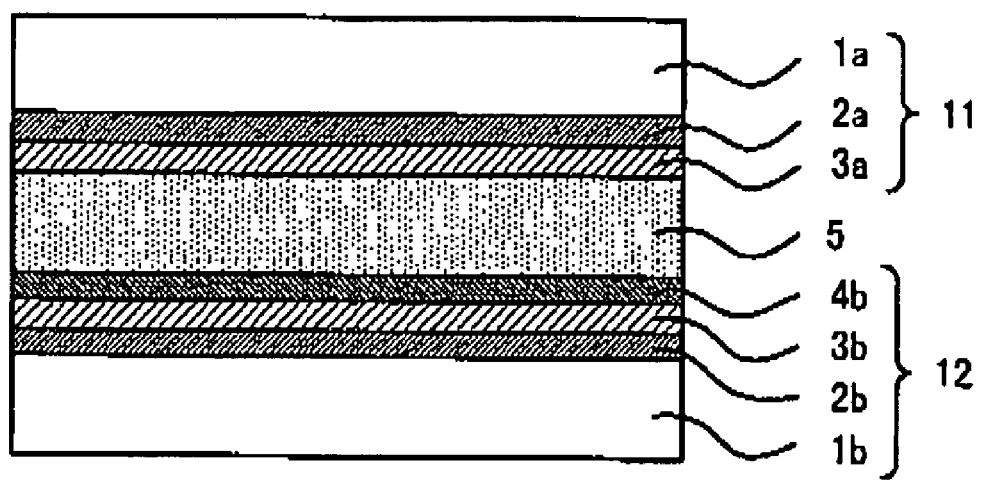
FIG. 1 is a schematic sectional view illustrating one example of the liquid crystal display of the present invention.

The present inventors have found out that a columnar alignment layer having the alignment function of controlling the alignment of the ferroelectric liquid crystal and the polarizing function of changing the non polarized light beam to the linear polarized light beam can be obtained by a simple method with utilizing the self organization of the plate-like molecule having the photo dichroism in the visible light range.

However, in the case the ferroelectric liquid crystal is directly contacted with the columnar alignment layer, since the ferroelectric liquid crystal is aligned in the axial direction of the column structure formed by the plate-like molecule, it is preferable that the two columnar alignment layers are disposed such that the normal directions of the plate-like molecules of the columnar alignment layers are substantially parallel to each other with the ferroelectric liquid crystal interposed therebetween.

On the other hand, since the columnar alignment layer is for changing a non polarized light beam to a linear polarized light beam in the axial direction of the column structure, in order to visualize the liquid crystal display, it is preferable that the two columnar alignment layers are disposed such that the normal directions of the plate-like molecules of the columnar alignment layers are substantially perpendicularly with the ferroelectric liquid crystal disposed therebetween.

Then, as a result of the further elaborate discussion of the present inventors, it was found out that by forming a reactive liquid crystal layer, produced by fixing a reactive liquid crystal including a polymerizable liquid crystal material and showing the nematic phase, on one of the columnar alignment layers so as to provide the anisotropy of the columnar alignment layer with the direction thereof changed to the reactive liquid crystal layer, the alignment function and the polarizing function of the columnar alignment layer can be performed more effectively via the reactive liquid crystal layer so as to complete the present invention based on the knowledge.

That is, liquid crystal display of the present invention provides a first alignment substrate having a first substrate, a first electrode layer formed on the first substrate and a first alignment layer formed on the first electrode layer, and a second alignment substrate having a second substrate, a second electrode layer formed on the second substrate, a second alignment layer formed on the second electrode layer, and a reactive liquid crystal layer formed on the second alignment layer, produced by fixing a reactive liquid crystal including a polymerizable liquid crystal material, and showing the nematic phase, disposed such that the first alignment layer and the reactive liquid crystal layer face with each other, with a ferroelectric liquid crystal interposed between the first alignment substrate and the second alignment substrate, wherein the second alignment layer has a column structure with a plate-like molecule having a photo dichroism in a visible light range laminated with the normal direction of the plate-like molecule aligned in a certain direction, and it is a columnar alignment layer having the alignment function and the polarizing function.

Accordingly, the second alignment layer used in the liquid crystal display of the present invention comprises a column structure with a plate-like molecule having a photo dichroism in a visible light range laminated with the normal direction of the plate-like molecule aligned in a certain direction, and it is a columnar alignment layer.

According to the columnar alignment layer, since the axial direction of the column structure formed with the plate-like molecule is aligned in a certain direction, the columnar alignment layer has the anisotropy in the axial direction of the column structure. On the other hand, since the plate-like molecule has the photo dichroism in the visible light range, the columnar alignment layer has the polarizing function of changing the non polarized light beam to the linear polarized light beam by the anisotropy and the photo dichroism in the visible light range of the plate-like molecule.

Further, since the column structure and the ferroelectric liquid crystal interact via the reactive liquid crystal layer, the columnar alignment layer has the alignment function for controlling the alignment of the ferroelectric liquid crystal.

According to the liquid crystal display of the present invention, since the columnar alignment layer having the alignment function and the polarizing function is used as the second alignment layer, compared with the case of separately providing the polarizing plate, scattering of the light beam generated at the interface between the polarizing plate and the other functional layers can be better solved, and thereby the deterioration of the light transmission can be restrained.

Moreover, according to the liquid crystal display of the present invention, since the columnar alignment layer having the polarizing function (second alignment layer) is formed inside the second substrate so as not to suffer the influence of the birefringence of the second substrate, the selection range of the material used for the second substrate can be widened so that a plastic substrate having the birefringence can also be used as the second substrate to achieve a thin shape and a light weight of the liquid crystal display. Furthermore, since the columnar alignment layer has the alignment function and the polarizing function, there is no need of separately forming the polarizing plate and the alignment layer so that the manufacturing method of the liquid crystal display can be simplified. This would lead to the cutback of the production cost of the liquid crystal display.

Furthermore, since the columnar alignment layer used in the present invention is formed, utilizing the self organization of the plate-like molecule, it can be formed by a simple method without the need of the alignment process such as the rubbing process and the photo alignment process, and thus it is highly practical.

Furthermore, according to the liquid crystal display of the present invention, since the gap between the first alignment layer and the reactive liquid crystal layer is filled with the ferroelectric liquid crystal, owing to the interaction between the ferroelectric liquid crystal and these functional layers, generation of the alignment defect such as the double domains can be prevented so that the mono-domain alignment of the ferroelectric liquid crystal can easily be obtained, and thus it is advantageous.

Such a liquid crystal display of the present invention will be explained with reference to the drawings. FIG. 1 is a schematic cross-sectional view showing an example of the liquid crystal display of the present invention. As shown in FIG. 1, a first alignment substrate 11 having a first substrate 1a, a first electrode layer 2a formed on the first substrate 1a and a first alignment layer 3a formed on the first electrode layer 2a, and a second alignment substrate 12 having a second substrate 1b, a second electrode layer 2b formed on the second substrate 1b, a second alignment layer 3b formed on the second electrode layer 2b, and a reactive liquid crystal layer 4b formed on the second alignment layer 3b are formed and disposed such that the first alignment substrate 11 and the second alignment substrate 12 are disposed so as to have the first alignment layer 3a and the reactive liquid crystal layer 4b face with each other, Moreover, a ferroelectric liquid crystal is interposed between the first alignment layer 3a and the reactive liquid crystal layer 4b so as to provide a liquid crystal layer 5.

According to the liquid crystal display of the present invention having such a structure, the second alignment layer 3b has a column structure with the plate-like molecule having a photo dichroism in a visible light range laminated with the normal direction of the plate-like molecule oriented in a certain direction, and it is a columnar alignment layer having the alignment function and the polarizing function. Hereinafter, the columnar alignment layer will be explained.

Figure 2A:
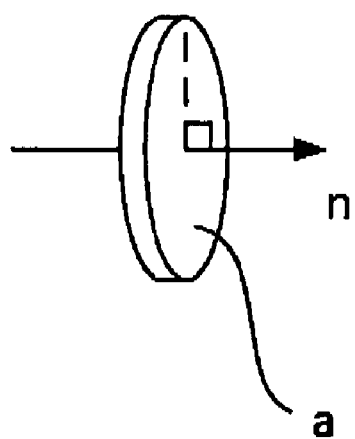
FIGS. 2A and 2B are a diagram for explaining the plate-like molecule and the column structure of the columnar alignment layer used in the present invention.
Figure 2B:
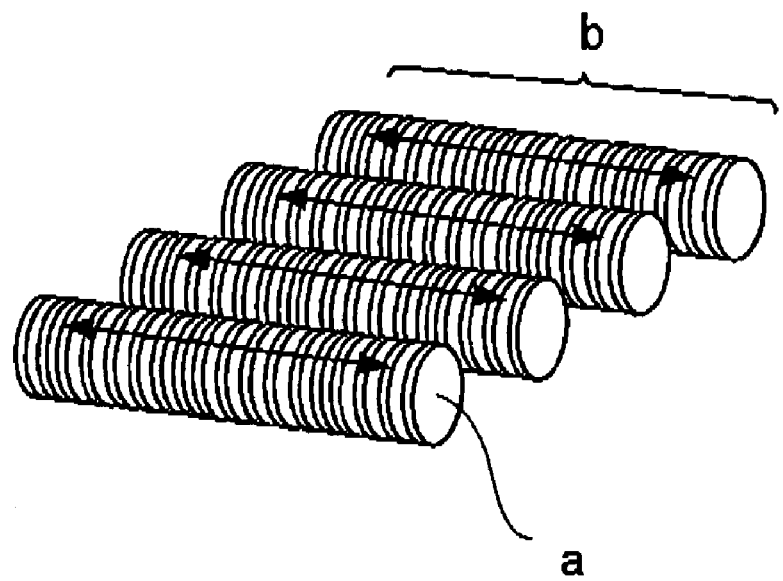

FIG. 2A is a diagram showing the model structure of the plate-like molecule having a photo dichroism in a visible light range used in the present invention and the normal direction. FIG. 2B is a schematic perspective view of the columnar alignment layer. As shown in FIG. 2B, according to the columnar alignment layer, the plate-like molecule a is laminated with the normal direction n of the plate-like molecule a oriented in a certain direction so as to form a column structure b. By arranging a plurality of such columnar structures b, a columnar alignment layer is provided.

Therefore, the axial direction of the column structure b is aligned in a certain direction as shown by the arrows in the figure. According to the interaction of the column structure b and the ferroelectric liquid crystal via the reactive liquid crystal layer, the columnar alignment layer has the alignment function for controlling the alignment of the ferroelectric liquid crystal.

The columnar alignment layer in the present invention has the anisotropy according to the alignment of the axial direction of the column structure b in a certain direction as mentioned above. On the other hand, since the plate-like molecule "a" has the photo dichroism in the visible light range, the columnar alignment layer has the polarizing function of changing the non polarized light beam to the linear polarized light beam by the anisotropy and the photo dichroism of the plate-like molecule in the visible light range.

Accordingly, since the second alignment layer is a columnar alignment layer having the polarizing function, a polarizing plate is not required on the second alignment substrate side. However, in the case the first alignment substrate is not provided with a layer having the polarizing function, a polarizing layer may be provided on the first alignment substrate side. At the time, the normal direction of the plate-like molecule of the second alignment layer and the optical axis of the polarizing layer provided on the first alignment substrate side are disposed substantially perpendicularly.

According to the liquid crystal display of the present invention, since the columnar alignment layer having the alignment function and the polarizing function is used, compared with the case of providing the polarizing plate separately, scattering of the light beam generated at the interface between the polarizing plate and the other functional layers can be better solved, and thereby the deterioration of the light transmittance can be restrained. Moreover, since the columnar alignment layer (second alignment layer) is formed inside the second substrate, the selection range of the material used for the second substrate can be widened so that a plastic substrate having the birefringence can be used to achieve a thin shape and a light weight of the liquid crystal display.

Moreover, since the alignment layer and the polarizing plate needs not be formed separately as in the conventional configuration, the manufacturing method of the liquid crystal display can be simplified. These can lead to also the cutback of the production cost.

Moreover, since a columnar alignment layer used in the present invention is formed, utilizing the self organization of the plate-like molecule, it can be formed by a simple method without the need of an alignment process, and thus it is highly practical.

Figure 3:
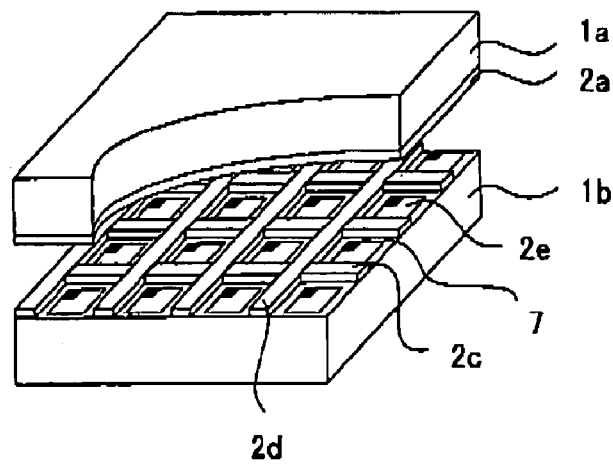
FIG. 3 is a schematic perspective view illustrating one example of the liquid crystal display of the present invention.
Figure 4:
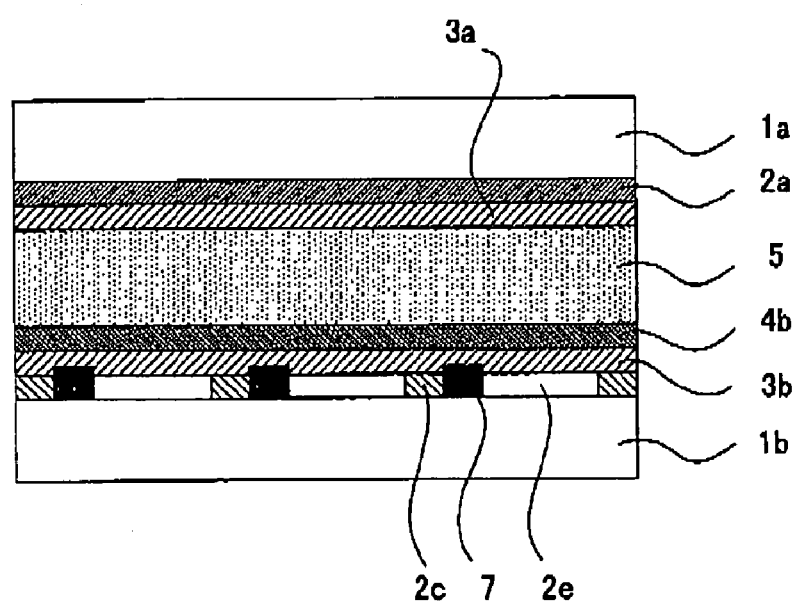
FIG. 4 is a schematic sectional view illustrating one example of the liquid crystal display of the present invention.

It is preferable that the liquid crystal display of the present invention comprises a combination of one of the substrates as a TFT substrate with the TFT element disposed in a matrix and the other substrate as a common electrode substrate with the common electrode formed in the entire area so as to be of the active matrix drive as shown in, for example, FIGS. 3 and 4. Since the liquid crystal display of the present invention is of the active matrix drive, a targeted pixel can be turned on or off surely and a high quality display can be obtained. Such a liquid crystal display of the active matrix drive using the TFT element will be explained hereinafter.

FIG. 3 is a schematic perspective view showing an example of the liquid crystal display of the present invention, and FIG. 4 is a schematic sectional view thereof. In FIG. 3, the first alignment substrate is a common electrode substrate with the first electrode layer 2a provided as the common electrode, and on the other hand, the second alignment substrate is a TFT substrate with the second electrode layer having an x electrode 2c, a y electrode 2d and a pixel electrode 2e. In the liquid crystal display, the x electrodes 2c and the y electrodes 2d are arranged each vertically and laterally. By applying a signal to these electrodes, the TFT element 7 is operated so as to drive the ferroelectric liquid crystal. The intersections of the x electrodes 2c and the y electrodes 2d are insulated by an unshown insulating layer so that the signal for the x electrodes 2c and the signal for the y electrodes 2d can be operated independently. A portion surrounded by the x electrodes 2c and the y electrodes 2d is a pixel as the smallest unit for driving the liquid crystal display of the present invention. In each pixel, at least one TFT element 7 and a pixel electrode 2e are formed. According to the liquid crystal display of the present invention, by successively applying a voltage to the x electrodes 2c and the y electrodes 2d, the TFT element 7 of each pixel can be operated. In FIG. 3, the liquid crystal layer, the first alignment layer, the second alignment layer and the reactive liquid crystal layer are omitted.

The liquid crystal display of the present invention can be used as a color liquid crystal display by adopting the color filter system or the field sequential color system. In particular, it is preferably driven by the field sequential color system. The field sequential color system is for enabling the color display by switching on or off the liquid crystal synchronously with flickering of the LED of the three colors of red, green and blue without the use of a color filter. Thereby, a bright, highly precise color moving image display can be realized with a low power consumption, a low cost and a wide view angle.

In this case, the ferroelectric liquid crystal is preferably one showing the mono-stability driving characteristic. It is particularly preferably one of the half-V-shaped drive with the liquid crystal molecules operated only at the time either a positive voltage or a negative voltage is applied. As the ferroelectric liquid crystal, by using such material, the light leakage at the time of the dark part operation (black and white shutter aperture closed) can be reduced so that the opening time as the black and white shutter can be made sufficiently long. Thereby, each color to be switched by a time duration can be displayed further brightly so that a bright color liquid crystal display can be obtained.

On the other hand, in the case of providing a color liquid crystal display by adopting the color filter system, a micro color filter disposed as a matrix of the TFT element 7 may be formed between the first electrode layer 2a as the common electrode and the substrate 1a.

Accordingly, the liquid crystal display of the present invention, as mentioned above, comprises the first alignment substrate and the second alignment substrate, disposed to face each other, with the ferroelectric liquid crystal interposed between the alignment substrates. Each constituent member of the liquid crystal display of the present invention having these structures and a manufacturing method of the same will be explained hereinafter.

(1) Second Alignment Substrate

First, the second alignment substrate used in the present invention will be explained. In the present invention, the second alignment substrate comprises a second substrate, a second electrode layer formed on the second substrate, a second alignment layer formed on the second electrode layer, and a reactive liquid crystal layer formed on the second alignment layer.

a. Second Alignment Layer

The second alignment layer used in the present invention has a column structure with plate-like molecule having a photo dichroism in a visible light range laminated with the normal direction of the plate-like molecule oriented in a certain direction, and it is a columnar alignment layer having the alignment function and the polarizing function.

The columnar alignment layer accordingly used in the present invention having the column structure is provided with the alignment function for controlling the alignment of the ferroelectric liquid crystal owing to the interaction of the column structure and the ferroelectric liquid crystal via the reactive liquid crystal layer to be described later.

Moreover, since the plate-like molecule comprising the column structure has the photo dichroism in the visible light range and the columnar alignment layer has the anisotropy in the axial direction of the column structure as mentioned above, it has the polarizing function owing to the anisotropy and the photo dichroism in the visible light range of the plate-like molecule.

Since the columnar alignment layer is formed, utilizing the self organization of the plate-like molecule, the production process is simple without the need of the alignment process such as the rubbing process and the photo alignment process, and thus it is advantageous in that the apparatus cost can be reduced. For example, by forming a coating film while coating a columnar alignment layer forming coating solution and drying the coating film so as to fix the column structure, the columnar alignment layer having the column structure can be formed.

The columnar alignment layer of the present invention is not particularly limited as long as it has the column structure as mentioned above, and the alignment function and the polarizing function, however, it is preferably one comprising a resin layer with a concave part or a convex part having a predetermined width formed on the surface in a pattern, and the column structure formed along the concave part of the resin layer. Accordingly, since the column structure is formed along the concave part of the resin layer, the column structure can be aligned easily in a certain direction. Hereinafter, the column structure and the resin layer will be explained.

(Column Structure)

First, the column structure comprising the columnar alignment layer will be explained. The column structure used in the present invention comprises the plate-like molecule having the photo dichroism in the visible light range laminated with the normal direction thereof oriented in a certain direction.

The "plate-like molecule" here denotes those having at least a plurality of aromatic ring structures with the core portion of the molecule disposed flatly.

The plate-like molecule is not particularly limited as long as it forms a column structure by being laminated like a pillar.

As the plate-like molecule, for example, plate-like molecule having a hydrophilic group such as a sulfonic acid group, or plate-like molecule having a hydrophobic group such as a long chain alkyl group can be presented. In particular, it is preferable to use the plate-like molecule having a hydrophilic group. According to the plate-like molecule having a hydrophilic group, since the hydrophilic group is small so that the distance between the adjacent column structures is close, the column structure can be arranged easily. Moreover, by neutralizing the hydrophilic parts of the sulfonic acid group, or the like after coating and drying so as to be poor soluble or insoluble to water, the fixing process can be facilitated.

As the hydrophilic group, sulfonic acid based hydrophilic groups such as a sulfonic acid group, a sodium sulfonate group, an ammonium sulfonate group, a lithium sulfonate group and a potassium sulfonate group, carboxylic acid based hydrophilic groups such as a carboxyl group, a sodium carboxylate group, an ammonium carboxylate group, a lithium carboxylate group, and a potassium carboxylate group, a hydroxyl group, an amino group, or the like can be presented. Among these examples, the sulfonic acid based hydrophilic groups are preferable, The formation of the column structure by the plate-like molecule can be confirmed by the measurement of the columnar alignment layer using a X ray diffractometer.

Among the example, as the plate-like molecule used in the present invention, those capable of forming the column structure in a solution so as to show the lyotropic liquid crystal phase are preferable because the plate-like molecule showing the lyotropic liquid crystal phase in a solution have a high self organization force. For example, by coating a columnar alignment layer forming coating solution containing the plate-like molecule which shows the lyotropic liquid crystal phase in a solution, the column structure can easily be oriented, utilizing the self organization of the plate-like molecule.

As the plate-like molecule showing the lyotropic liquid crystal phase in a solution, the plate-like molecule showing the lyotropic liquid crystal phase in an aqueous solution, and the plate-like molecule which shows the lyotropic liquid crystal phase in an organic solvent can be presented. The kind of the solutions differs depending on the substituent of the plate-like molecule. In the case the plate-like molecule has a hydrophilic group such as a sulfonic acid group, an aqueous solution is used, and in the case it has a hydrophobic group such as a long chain alkyl group, an organic solvent is used.

In particular, in the invention, it is preferable that the plate-like molecule forms a column structure in an aqueous solution and shows the lyotropic liquid crystal phase. Since such plate-like molecule forms the column structure by the self organization in an aqueous solution and shows the lyotropic liquid crystal phase, by coating the columnar alignment layer forming coating solution containing the plate-like molecule, the column structure can easily be aligned. Furthermore, since the plate-like molecule is water soluble, the fixing process for fixing the column structure can be facilitated.

As the specific examples of the plate-like molecule having the photo dichroism in the visible light range and shows the lyotropic liquid crystal phase in an aqueous solution, the substances represented by the below-mentioned chemical formulae can be presented.

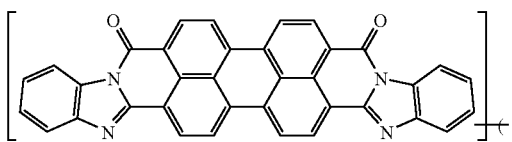  I

M is a cation.
n is an integer from 2 to 4.

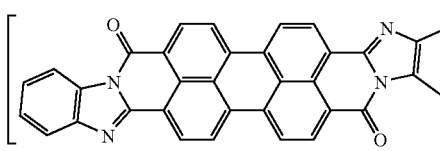  II

M is a cation.
n is an integer from 2 to 4.

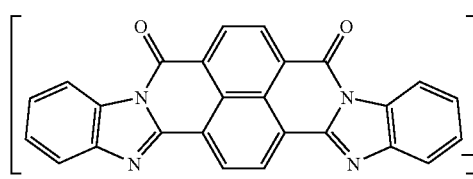  III

M is a cation.
n is an integer from 2 to 4.

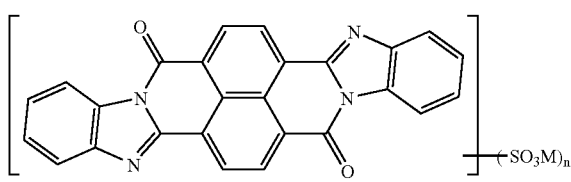  IV

M is a cation.
n is an integer from 2 to 4.

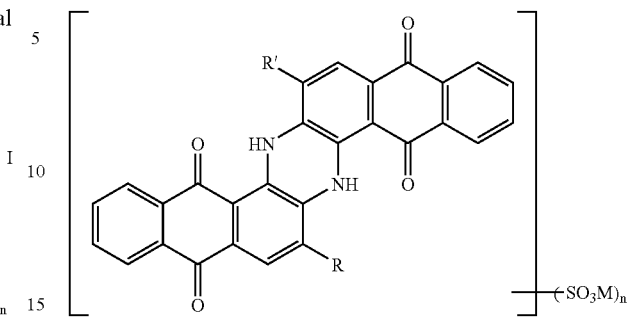  V

R is H or Cl.
R' is H or an alkyl group.
M is a cation.
n is an integer from 2 to 4.

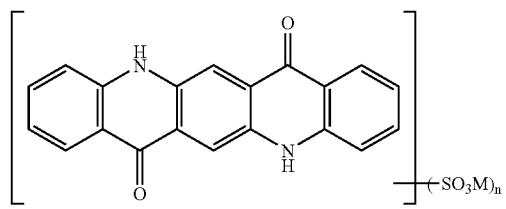

M is a cation.
n is an integer from 2 to 4.

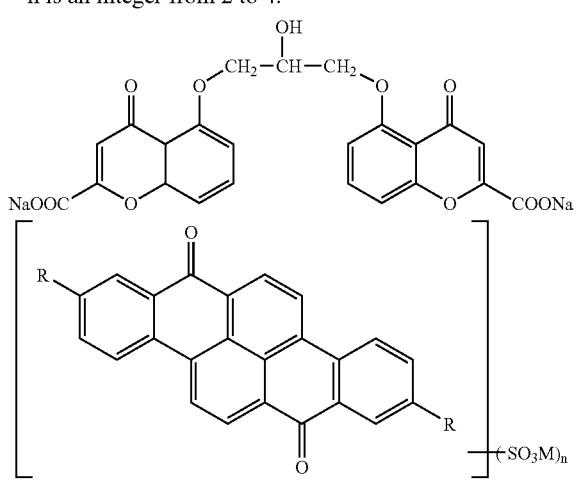

R is H, Br, NHAr, or

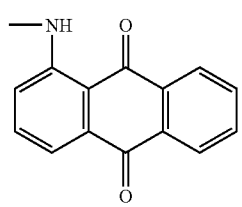

M is a cation.
is an integer from 2 to 4.

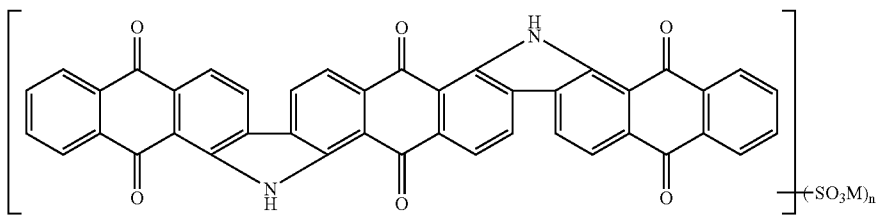
M is a cation.
n is an integer from 2 to 4.
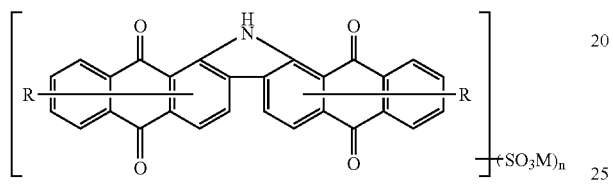
R is H or NHCOPh.
M is a cation.
n is an integer from 2 to 4.
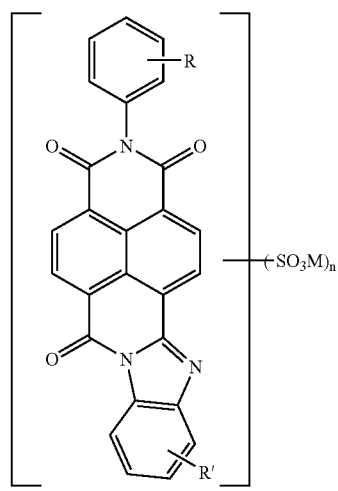
R, R' are H, a halogen, an alkyl group, an alkoxy group, ArNH, or OPh.
M is a cation.
n is an integer from 2 to 4.
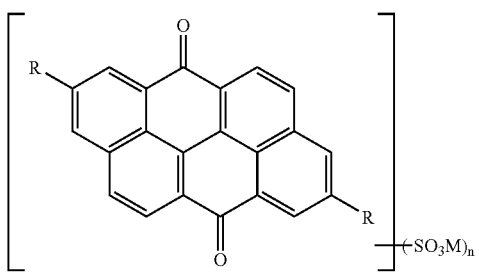
R is H, Br, NHAr, or
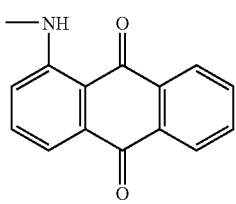
M is a cation.
n is an integer from 2 to 4.
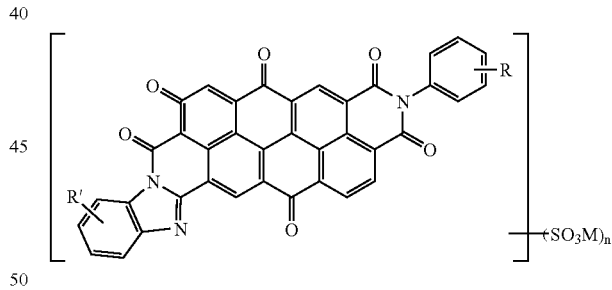
R, R' are H, a halogen, an alkyl group, an alkoxy group, ArNH, or OPh.
M is a cation.
n is an integer from 2 to 4.
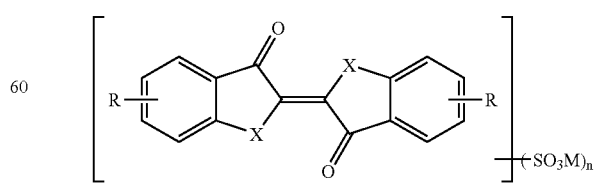
X is NH or S.
R is a halogen or an alkoxy group.

M is a cation.
n is an integer from 2 to 4.

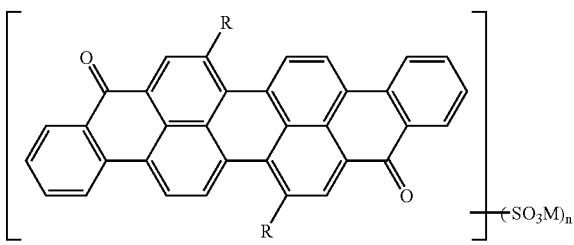

R is H, OH, or OCH$_3$.
M is a cation.
n is an integer from 2 to 4.

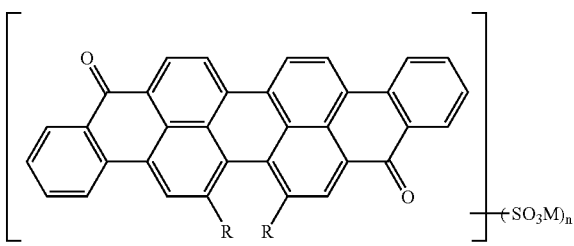

R is H, OH, or OCH$_3$.
M is a cation.
n is an integer from 2 to 4.

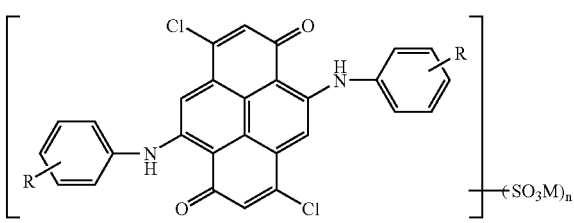

R is H, a halogen, an alkyl group, an alkoxy group, ArNH, or OPh.
N is a cation.
n is an integer from 2 to 4.

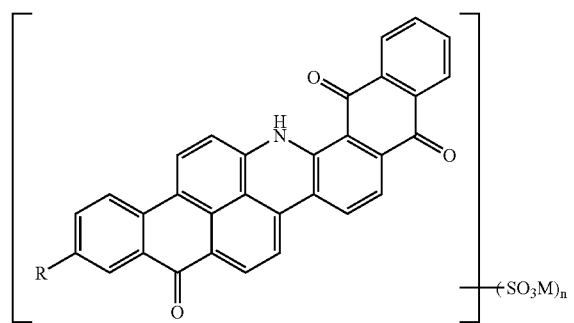

R is H, Br, NHAr, or

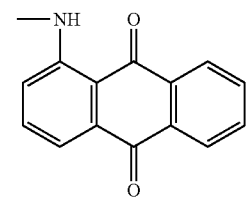

M is a cation.
n is an integer from 1 to 3.

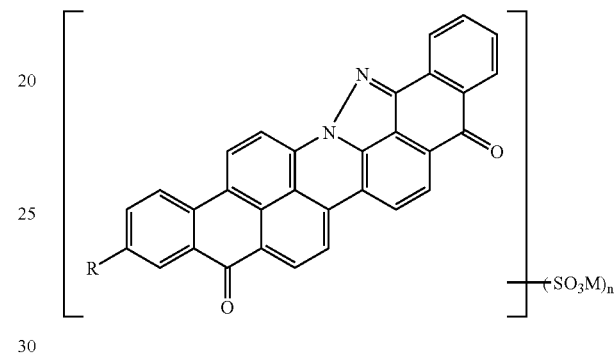

R is H, Br, NHAr, or

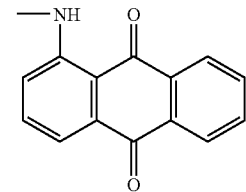

M is a cation.
n is an integer from 2 to 4.

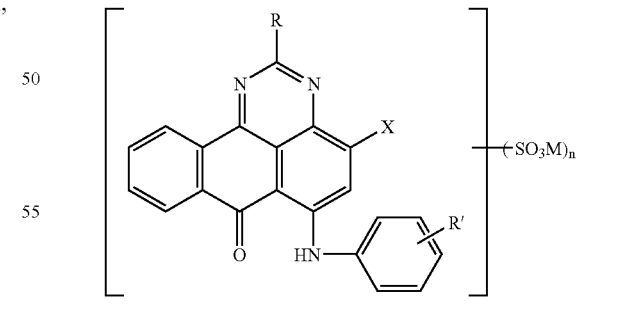

X is H, Br, or SO$_3$M.
R is H or an alkyl group.
R' is H, a halogen, an alkyl group, an alkoxy group, NHPh, or OPh.
M is a cation.
n is an integer from 2 to 4.

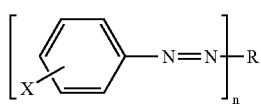
X is COOM or PO(OM)$_2$.
R', R" are H, or a halogen.
Y is NH$_2$ or OM.
M is a cation.
n is 1 or 2.
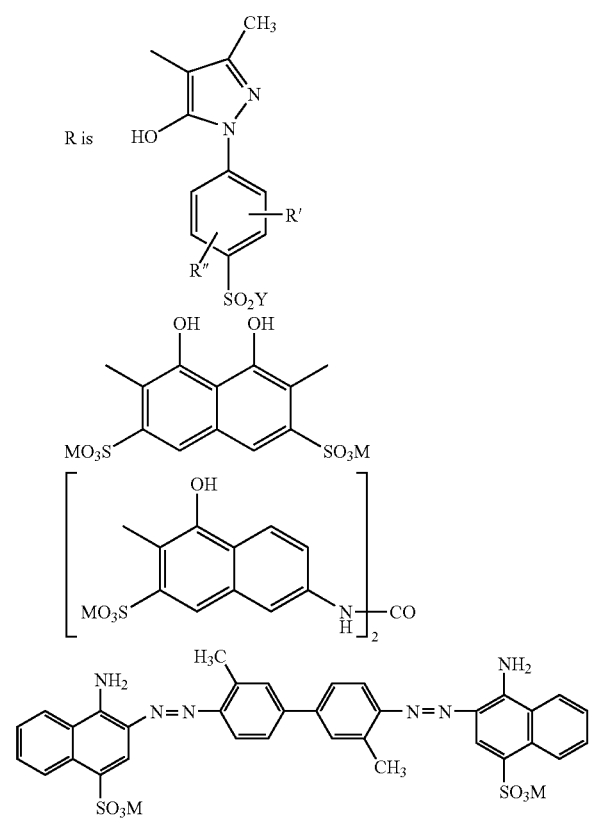
M is a cation.
X is O, CH$_2$, NH, CONH, NHCONH, or CH=CH.
Y is H, CH$_3$, CH$_3$O, COOM, or SO$_3$M.
R' is H, NO$_2$, COOM, or SO$_3$M.
M is a cation.
R' is COOM or SO$_3$M.
M is a cation.
X is O, CH$_2$, NH, CONH, NHCONH, or CH=CH.
Y is COOM or SO$_3$M.
M is a cation.
Y is SO$_3$M.
M is a cation.
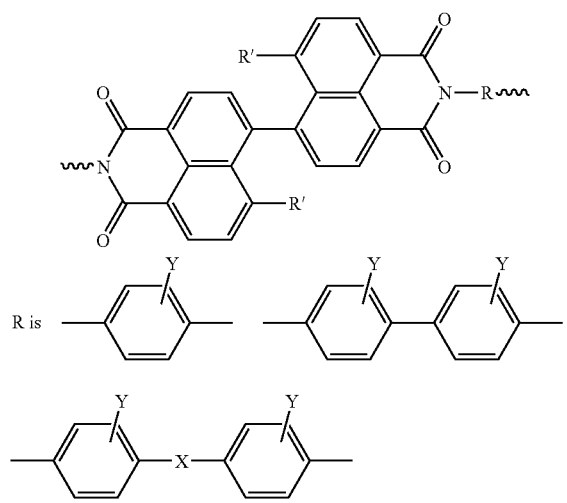

X is O, CH$_2$, NH, CONH, NHCONH, or CH=CH.
Y is COOM or SO$_3$M.
M is a cation.

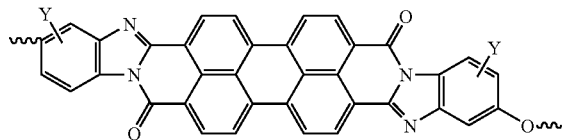

Y is SO$_3$M.
M is a cation.

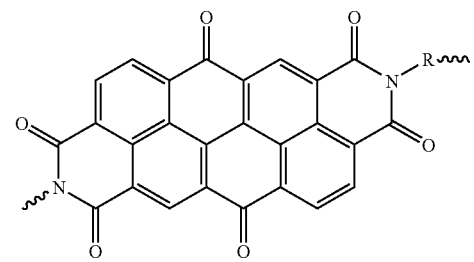

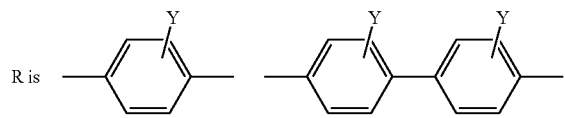

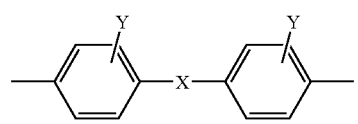

X is O, CH$_2$, NH, CONH, NHCONH, or CH=CH.
Y is COOM or SO$_3$M.
M is a cation.

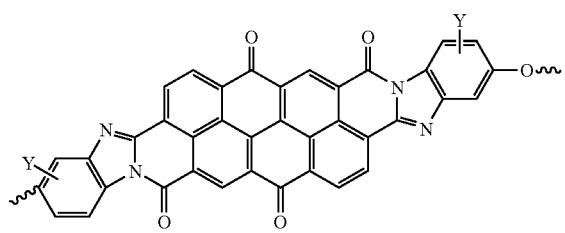

Y is COOM or SO$_3$M.
M is a cation.

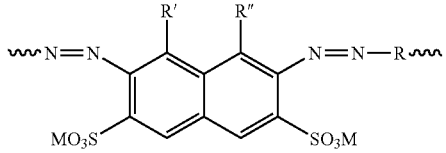

R is 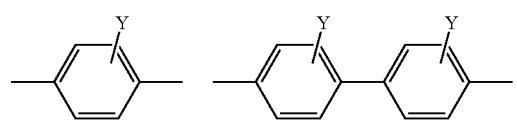

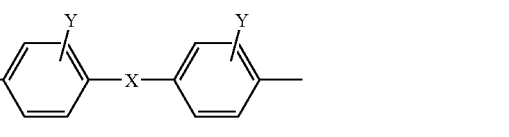

X is O, CH$_2$, NH, CONH, NHCONH, or CH=CH.
Y is H, CH$_3$, CH$_3$O, COOM, or SO$_3$M.
R', R" are OH or NH$_2$.
M is a cation.

~A-R~

A is one of the following a, b, c, d, e, f, g, or h.

R is 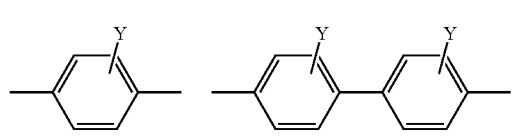

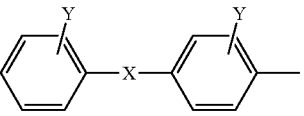

X is O, CH$_2$, NH, CONH, NHCONH, or CH=CH.
Y is COOM or SO$_3$M.
M is a cation.

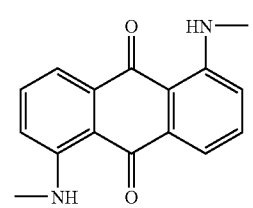

a

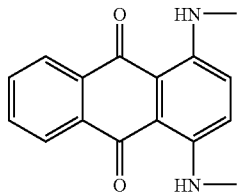

b

-continued
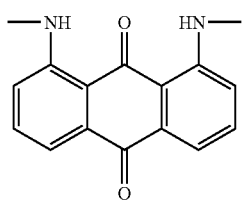c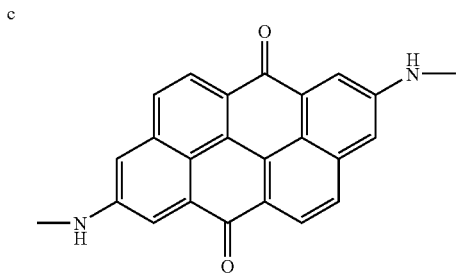d
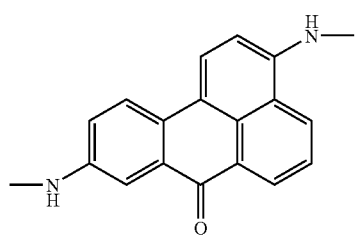e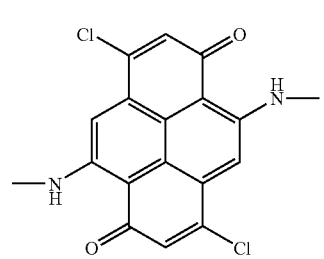f
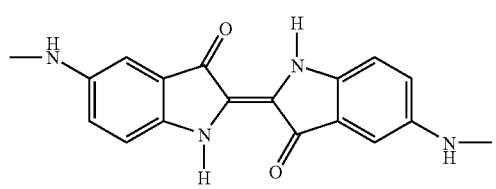g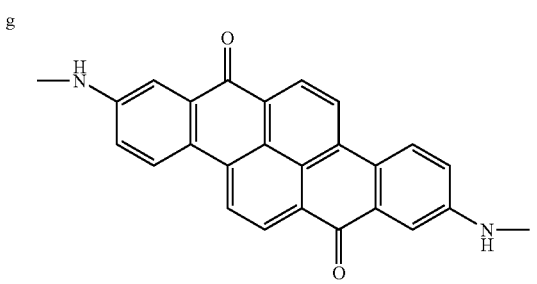h
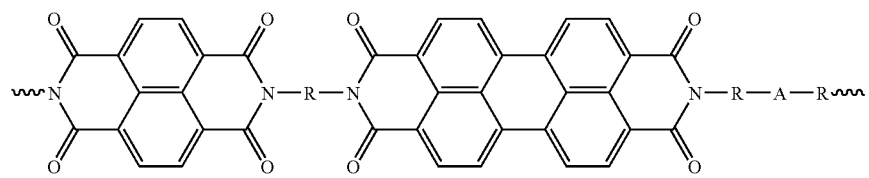
A is one of the following a, b, c, d, e, f, g, or h.
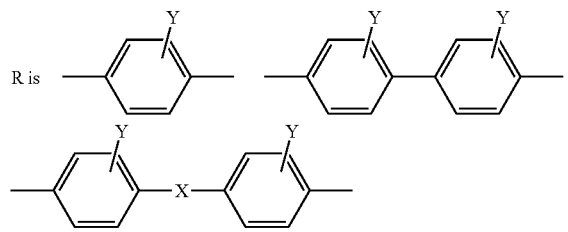
R is
X is O, CH$_2$, NH, CONH, NHCONH, or CH=CH.
Y is COOM or SO$_3$M.
M is a cation.
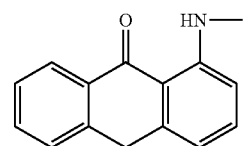a
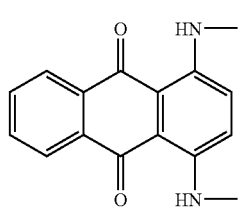b

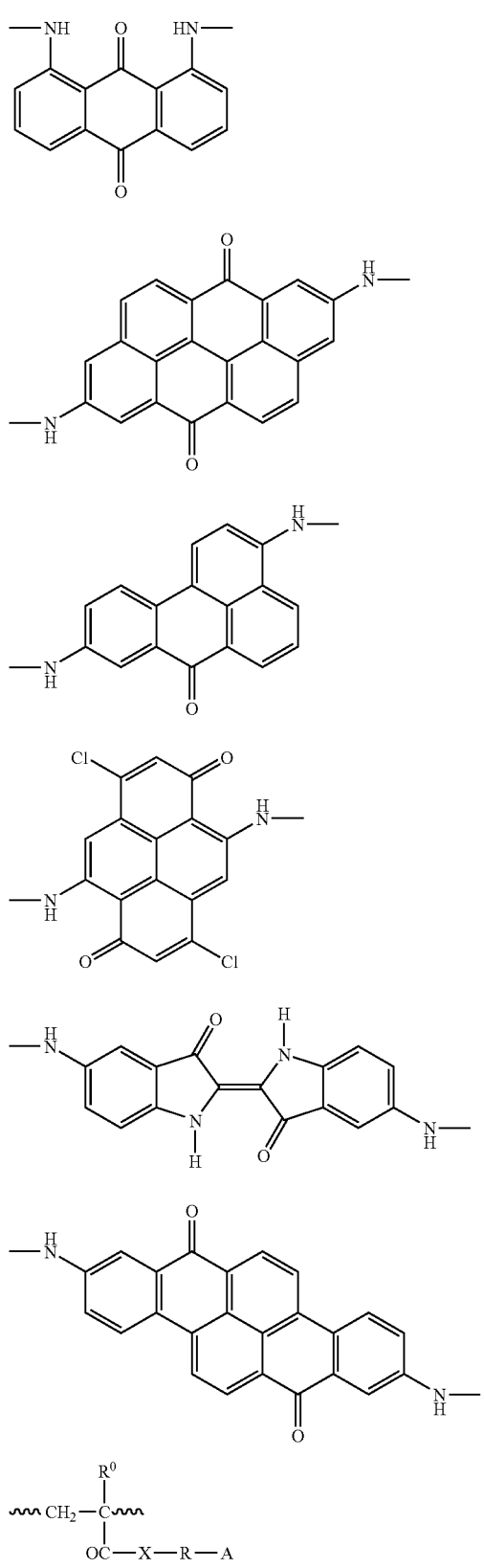
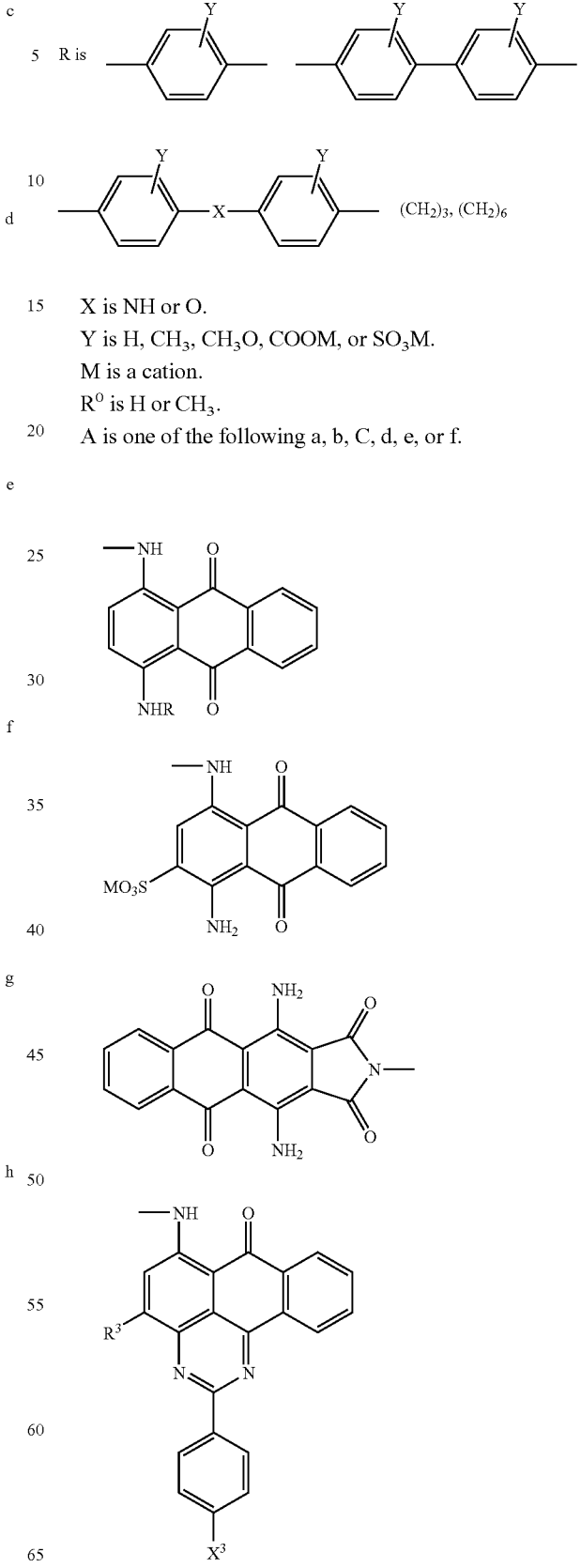
X is NH or O.
Y is H, CH$_3$, CH$_3$O, COOM, or SO$_3$M.
M is a cation.
R$^0$ is H or CH$_3$.
A is one of the following a, b, C, d, e, or f.

-continued
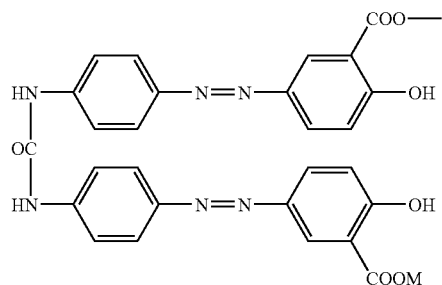
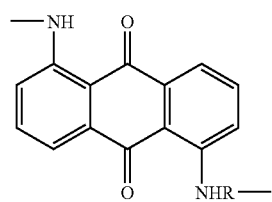
R³ is H, Br, or SO₃M.
X³ is H or SO₃M.
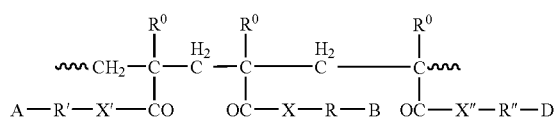
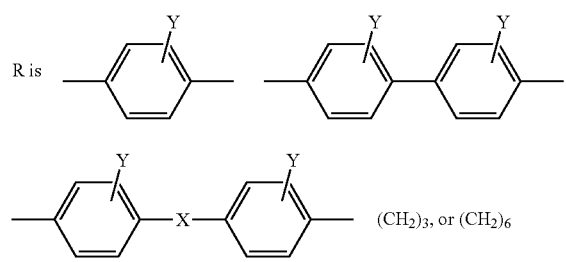
X, X', X" are NH or O.
Y is H, CH₃, CH₃O, COOM, or SO₃M.
M is a cation.
Rº is H or CH₃.
A, B, D is one of the following a, b, c, d, e, or f.
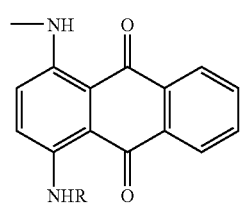
a
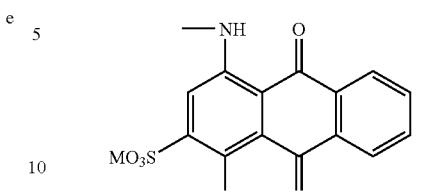
b
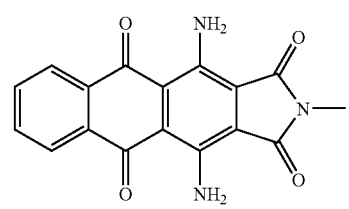
c
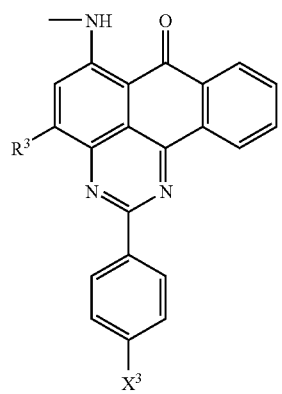
d
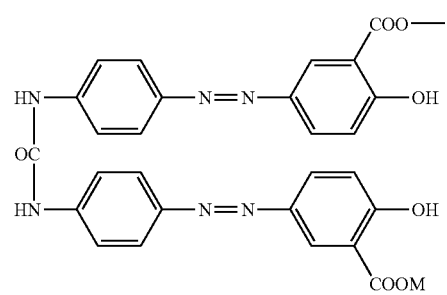
e
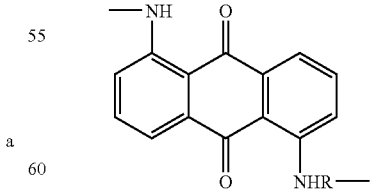
f
R³ is H, Br, or SO₃M.
X³ is H or SO₃M.

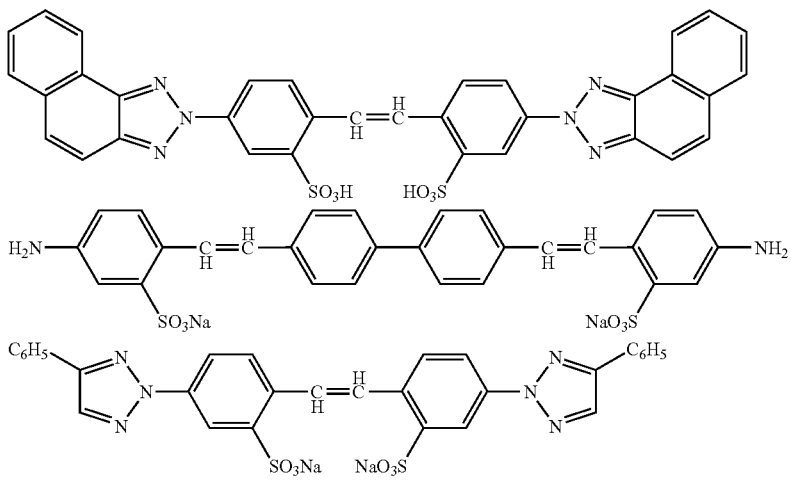

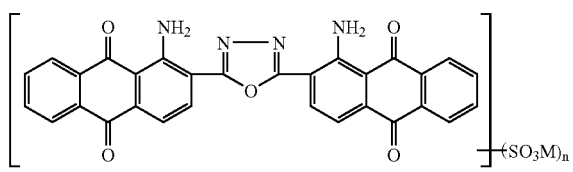

n is 2.
M is a cation.

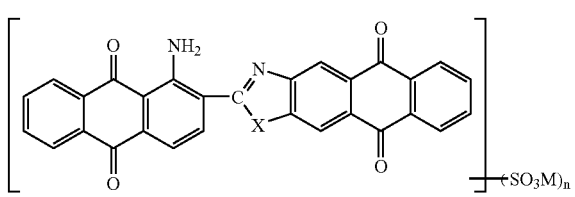

n is 2 or 3.
M is a cation.

n is an integer from 2 to 4.
M is a cation.

n is 2.
M is a cation.

R, R' are H, Cl, an alkyl group, or an alkoxy group.

It is preferable that the alkyl group in each of the chemical formula has 1 to 4 carbon atom. Moreover, the halogen in each of the chemical formula is preferably Cl or Br. Furthermore, as the cation in each of the chemical formula, $H^+$, $Li^+$, $Na^+$, $K^+$, $Cs^+$ or $NH_4^+$ can be presented.

In the present invention, among the substances, the substances represented by the chemical formulae I to V can be used preferably. Moreover, the substances can be used either alone by one kind or as a combination of two or more kinds.

Furthermore, as the material containing the plate-like molecule having the photo dichroism in the visible light range to show the lyotropic liquid crystal phase in an aqueous solution, or example, "N015" produced by Optiva, Inc. or the like can be presented.

Moreover, the plate-like molecule is not limited to those showing the lyotropic liquid crystal phase as mentioned above but also those showing the thermotropic liquid crystal phase may be used as well.

(Resin Layer)

Since the column structure is formed along the concave part of the resin layer having a concave part or a convex part with a predetermined width in the surface in a pattern, the column structure can be aligned in a certain direction. The pattern shape of the concave part or the convex part is not particularly limited as long as the plate-like molecule can form the column structure. In particular, it is preferably a pattern with the concave part or the convex part formed regularly by a certain interval as stripes.

The width of the concave part differs depending upon the kind of the plate-like molecule to be used, or the like. It is in general in a range of 0.1 μm to 10 μm, preferably in a range of 0.2 μm to 1 μm, and particularly preferably in a range of 0.2 μm to 0.4 μm. It is difficult to form the concave part width narrower than the range mentioned above in terms of the production method, and on the contrary, it may be difficult to align the column structure if the concave part width is too wide.

Moreover, the depth of the concave part is in a range of 0.05 μm to 1 μm, particularly preferably in a range of 0.1 μm to 0.2 μm. In the case the depth of the concave part is too shallow the function of alignment the plate-like molecule comprising the column structure is deteriorated, and in the case the concave part is too deep, an adverse effect can be cast on the alignment of the ferroelectric liquid crystal.

Here, the interval at the time of forming the concave part as the stripes differs depending on the kind of the plate-like molecule to be used, or the like. It is in general the interval between the ends of the adjacent concave parts, that is, the width of the convex part is half or less of the visible light wavelength, preferably in a range of 0.05 μm to 2 μm, more preferably in a range of 0.1 to 1 μm, and particularly preferably in a range of 0.1 μm to 0.2 μm, It is difficult to form the interval between the adjacent concave parts narrowly in terms of the production method, and it may be difficult to align the column structure if it is too wide. Moreover, if the interval between the adjacent concave parts is a value close to the wavelength of the light beam, optical problems such a coloring can be involved due to the diffraction of the light beam.

Moreover, the pitch of the concave parts can be selected optionally according to the kind of the plate-like molecule to be described later, or the like. It is in general in a range of 0.1 μm to 10 μm, preferably in a range of 0.2 μm to 1 μm, and particularly preferably in a range of 0.2 μm to 0.4 μm. It is difficult to form the interval between the adjacent concave parts narrowly in terms of the production method, and it may be difficult to align the column structure if it is too wide. Here, the "pitch of the concave parts" refers to the distance from the center to the center of the adjacent concave parts.

The cross-sectional shape of the concave part of the resin layer is not particularly limited, and it may be rectangular, trapezoid, or other shapes. In the present invention, it is particularly preferable that the cross-sectional shape of the concave part is rectangular because the column structure can easily be oriented and aligned in a certain direction.

Such a resin layer having the concave part or the convex part can be formed by or example preparing a concave part forming substrate having a convex part symmetrical to the shape of the targeted concave part on the surface and a concave part forming substrate for forming the resin layer by interposing a hardening resin composition with respect to the concave part forming substrate and hardening the same, laminating the concave part forming substrate and the concave part forming substrate with the hardening resin composition coated thereon so as to interpose the hardening resin composition, hardening the hardening resin composition, and removing the concave part forming substrate.

As the hardening resin used for the hardening resin composition, for example, hardening resins such as an unsaturated polyester, a melamine, an epoxy, a polyester(meth)acrylate, a urethane(meth)acrylate, an epoxy(meth)acrylate, a polyether(meth)acrylate, a polyol(meth)acrylate, a melamine (meth)acrylate, and a triazine based acrylate can be used alone or as a mixture. Moreover, the resin composition may either be a thermosetting resin or an ultraviolet ray curable resin, or a combination thereof.

Moreover, as needed, various kinds of additives such as a hardening agent and a photo polymerization initiating agent may be added to the resin composition. Moreover, the viscosity thereof may be adjusted using a solvent, a monomer, or the like for the application onto the concave part forming substrate.

Moreover, as to the film thickness of the resin layer, in general, the thickness of the portion with the concave part formed is 1 μm or less, and it is preferably 0.2 μm or less. In the case the thickness of the portion with the concave part formed is too thick, the liquid crystal display of the present invention may be thick and heavy. Moreover, in consideration to realize the thin shape of the liquid crystal display, the thickness of the portion with the concave part formed is preferably thin, however, since it is difficult to form a product too thin, the thickness of the portion with the concave part formed is in general 0.1 μm or more.

Here, in the present invention, in the case of copying such a rugged structure, in general, the formed resin layer surface may have a high water repellency, however, since the columnar alignment layer forming coating solution is to be coated onto the resin layer, it is preferable that the resin layer is hydrophilic. Therefore, a hydrophilic layer may be provided onto the resin layer, or the hydrophilic process may be applied to the resin layer surface. As a method of the surface treatment for the resin layer surface to make it lyophilic, a lyophilic surface treatment by the plasma process utilizing an argon, water, or the like can be presented. Moreover, as the lyophilic layer to be formed onto the resin layer, for example a silica film formed by the sol gel process of a tetraethoxy silane, or the like can be presented.

(Columnar Alignment Layer)

The thickness of the columnar alignment layer used in the present invention differs depending on the characteristics required to the liquid crystal display. It also differs in the case the columnar alignment layer is a single layer having the column structure and in the case it has the column structure and the resin layer. For example, in the case the columnar alignment layer is a single layer having the column structure, the thickness of the columnar alignment layer in general is preferably in a range of 50 nm to 2,000 nm, more preferably in a range of 100 nm to 1,000 nm, and further preferably in a range of 200 nm to 500 nm. In the case the thickness of the columnar alignment layer is too thin, the alignment of the ferroelectric liquid crystal may not be controlled sufficiently. On the other hand, in the case it is too thick, the alignment disturbance may be generated in the vicinity of the surface, and thus it is not preferable also in terms of the cost.

Moreover, the transmission of the columnar alignment layer is preferably 20% or more in the entire region, and it is more preferably 30% or more. The above-mentioned transmission can be measured by a spectrophotometer for ultraviolet and visible region.

Such a columnar alignment layer can be formed on the substrate in a state with the column structure maintained by forming a column structure comprising the plate-like molecule in a columnar alignment layer forming coating solution prepared by adding the plate-like molecule in a solvent, and coating the coating solution.

The above-mentioned columnar alignment layer forming coating solution may contain a liquid crystal material in addition to the plate-like molecule. For example, even in the case the plate-like molecule can hardly form the column structure, by aligning the liquid crystal material, the plate-like molecule can be aligned along the alignment direction of the liquid crystal material. As such a liquid crystal material, a liquid crystal material commonly used for forming a polarizing layer can be used. Moreover, the liquid crystal composition containing the liquid crystal material and the plate-like molecule may show either the lyotropic liquid crystal phase or the thermotropic liquid crystal phase. In general, one showing the thermotropic liquid crystal is used.

The solvent used for the columnar alignment layer forming coating solution can be selected optionally according to the substituent introduced to the plate-like molecule. For example, in the case a hydrophilic group such as a sulfonic acid group is introduced, water is used as the solvent. On the other hand, in the case a hydrophobic group such as a long chain alkyl group is introduced, an organic solvent is used. The organic solvent may as needed contain various kinds of the additives such as a surfactant including a polyethylene glycol. Among the ones mentioned above, according to the present invention, the columnar alignment layer forming coating solution is preferably water based because the fixing process to be described alter can be facilitated thereby.

The coating method for the columnar alignment layer forming coating solution is not particularly limited as long as the normal direction of the plate-like molecule can be aligned in a certain direction. For example, various coating methods such as Mayer bar coating, gravure coating, die coating, dip coating and spray coating, the screen printing method, the ink jet method, or the like can be used. The coating method can be determined optionally depending on either the column structure is formed on a plane or on the rugged surface as the resin layer.

For example, in the case the column structure is formed on a plane, it is preferable to select the coating method capable of applying the shearing stress out of the methods. By using the coating method capable of applying the shearing stress, the column structure formation can be facilitated. As the coating methods capable of applying the shearing stress, for example, Mayer bar coating, slot die coating and slide coating can be presented. In particular, it is preferable to use slot die coating.

On the other hand, in the case the column structure is formed on the rugged surface as the resin layer, it is preferable to use a coating method without applying the shearing stress so as to form the column structure along the rugged shape on the resin layer. In this case, as the coating method, the ink jet method, spray coating, dip coating and the flexo printing method can be used preferably. In particular, the ink jet method is preferable.

After coating the columnar alignment layer forming coating solution, the solvent contained in the coating film is evaporated for drying the coating film. As the drying method, the methods commonly used for drying the solvent, such as heat drying, room temperature drying, freeze drying, far infrared ray drying, or the like can be used.

After the drying operation, it is preferable to carry out the fixing process for fixing the alignment state of the plate-like molecule. For example, in the case the plate-like molecule to be used have a hydrophilic group, by carrying out the hydrophobic process, the column structure can be stabilized and the water resistance can be provided to the columnar alignment layer. The hydrophobic process solution used for the hydrophobic process is not particularly limited as long as it can process the hydrophilic group so as to be insoluble or poor soluble to water by for example cross-linking, and it differs depending on the hydrophilic group of the plate-like molecule to be used. Specifically, an aqueous solution of an alkaline earth metal salt such as a barium salt, a calcium salt and a magnesium salt can be used. Among them, it is preferable to use a barium chloride aqueous solution. For example, in the case the plate-like molecule has a $SO_3NH_4$ group, by coupling the sulfonic acid ion of the $SO_3NH_4$ group and the barium ion, the adjacent plate-like molecules can be cross-linked so as to fix the column structure.

The hydrophobic process method is not particularly limited as long as it is a method capable of processing the hydrophilic group so as to be hydrophobic, and a method for coating the hydrophobic process solution after coating the columnar alignment layer forming coating solution and drying, a method for soaking into the hydrophobic process solution, or the like can be presented. By washing and drying after coating or soaking in the hydrophobic process solution, the columnar alignment layer can be obtained.

On the other hand, in the case the plate-like molecule has a hydrophobic group such as a long chain alkyl group, by introducing a polymerizable group in the core portion of the plate-like molecule or a part of the alkyl side chain and polymerizing the polymerizable group, the plate-like molecule can be cross-linked linearly or like a mesh so as to fix the column structure.

Furthermore, in the case the columnar alignment layer forming coating solution contains a liquid crystal material, the alignment state of the plate-like molecule can also be fixed by polymerizing the liquid crystal material. In this case, the liquid crystal material needs to have a polymerizable group.

Accordingly, in the present invention, since the columnar alignment layer can be formed only by coating the columnar alignment layer forming coating solution and carrying out a simple post treatment, it is highly practical without the need of much production cost.

b. Reactive Liquid Crystal Layer

The reactive liquid crystal layer used in the present invention is produced by fixing a reactive liquid crystal including a polymerizable liquid crystal material, and showing the nematic phase. The reactive liquid crystal is aligned by the second alignment layer, and it is formed by for example, polymerizing the reactive liquid crystal with the ultraviolet ray irradiation for fixing the alignment state thereof.

According to the present invention, since the alignment state of the reactive liquid crystal is fixed, the reactive liquid crystal layer functions as an alignment layer for aligning the ferroelectric liquid crystal so that the alignment function and the polarizing function of the columnar alignment layer can both be realized.

Since the reactive liquid crystal layer used in the present invention is fixed on the second alignment layer accordingly, even in the case the ferroelectric liquid crystal is heated to a temperature higher than the phase transition point, the alignment disturbance can hardly be generated so that the excellent alignment stability can be provided. Moreover, since the reactive liquid crystal has a structure relatively similar to that of the ferroelectric liquid crystal so as to have a strong interaction with the ferroelectric liquid crystal, the reactive liquid crystal layer produced by fixing the reactive liquid crystal can effectively control the alignment of the ferroelectric liquid crystal.

(Reactive Liquid Crystal)

Hereinafter, the reactive liquid crystal used for such a reactive liquid crystal layer will be explained. The reactive liquid crystal used in the present invention which comprises a reactive liquid crystal layer by being fixed on the second alignment layer includes a polymerizable liquid crystal material and shows the nematic phase. Out of the liquid crystal phases, the nematic phase allows relatively easy alignment control, and thus by using the reactive liquid crystal showing the nematic phase, the anisotropy can be easily provided to the reactive liquid crystal layer by the second alignment layer. Moreover, since the reactive liquid crystal includes the polymerizable liquid crystal material, the alignment state of the reactive liquid crystal can easily be fixed.

As the polymerizable liquid crystal material, any of a polymerizable liquid crystal monomer, a polymerizable liquid crystal oligomer and a polymerizable liquid crystal polymer can be used, however, in the present invention, the polymerizable liquid crystal monomer can be used preferably. Compared to the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

The above-mentioned polymerizable liquid crystal monomer is not particularly limited as long as it is a liquid crystal monomer having a polymerizable functional group. For example, a monoacrylate monomer, a diacrylate monomer, or the like can be presented. Moreover, these polymerizable liquid crystal monomers may be used alone or as a mixture of two or more kinds.

As the monoacrylate monomer, for example, the compounds represented by the below-mentioned formula can be presented:

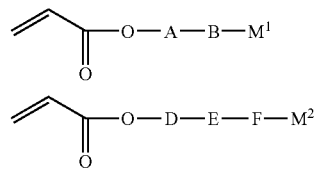

In the above-mentioned formula, A, B, D, E and F are a benzene, a cyclohexane or a pyrimidine, which may have a substituent group such as a halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

Moreover, as the diacrylate monomer, for example, the compounds represented by the below-mentioned formula can be presented:

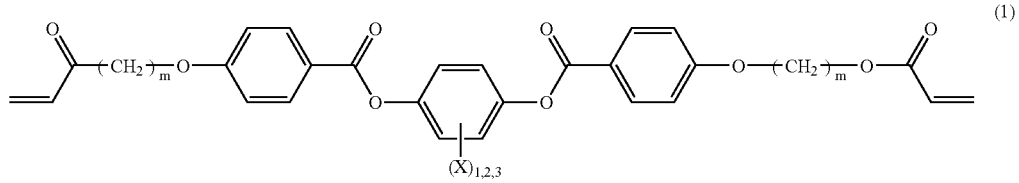

(1)

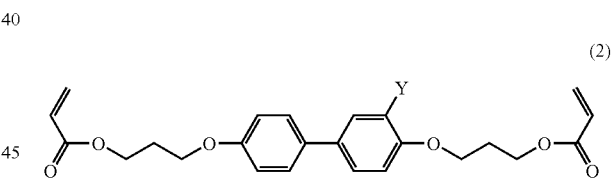

(2)

Here, X and Y in the above formula is a hydrogen, an alkyl having 1 to 20 carbon atoms, an alkenyl having 1 to 20 carbon atoms, an alkyloxy having 1 to 20 carbon atoms, an alkyloxycarbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro m is an integer in a range of 2 to 20. X is preferably an alkyloxy carbonyl having 1 to 20 carbon atoms, a methyl or a chlorine. In particular, it is preferably an alkyloxy carbonyl having 1 to 20 carbon atoms, and particularly preferably $CH_3(CH_2)_4$ OCO.

Furthermore, as the diacrylate monomer, for example, the compounds represented by the below-mentioned formula can also be presented:

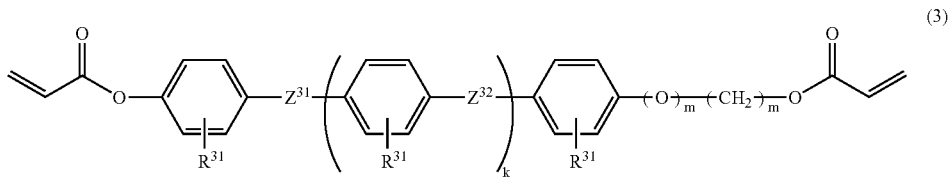

(3)

Here, $Z^{31}$ and $Z^{32}$ in the above formula are each independently directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—, $R^{31}$s are a hydrogen or an alkyl having 1 to 5 acrbon atoms. k and m is 0 or 1, and n is an integer in a range of 2 to 8.

Furthermore, as a specific example of the compound represented by the above formula (3), the compounds shown in below-mentioned formula can be cited:

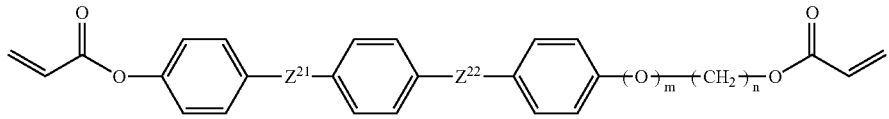

Here, $Z^{21}$ and $Z^{22}$ in the formula are each independently directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—. m is 0 or 1, and n is an integer in a range of 2 to 8.

In the present invention, in particular, the compounds represented by the above-mentioned formulae (1) or (3) can be used preferably. As the reactive liquid crystal containing a compound represented by the formula (3), for example, "ADEKA CHIRACOL PLC-7183", "ADEKACHIRACOL PLC-7209" produced by ASAHI DENKA CO., LTD. or the like can be presented. Moreover, as the reactive liquid crystal containing an acrylate monomer, for example, "ROF-5101", "ROF-5102" produced by the Rolic Technologies Ltd., or the like can be presented.

The second alignment layer used in the present invention is a columnar alignment layer as mentioned above. In the case the first alignment layer to be described later is also a columnar alignment layer, since the columnar alignment layer has the polarizing function, the first alignment layer and the second alignment layer are disposed such that the normal direction of the plate-like molecule of the first alignment layer and the normal direction of the plate-like molecule of the second alignment layer are provided substantially perpendicularly. On the other hand, since the columnar alignment layer also has the alignment function, in the case, the alignment directions of the upper and lower columnar alignment layers disposed with the ferroelectric liquid crystal interposed therebetween are substantially perpendicularly, and thus it is not a preferable arrangement for the alignment control of the ferroelectric liquid crystal. According to the present invention, even in the case of such arrangement, by providing the reactive liquid crystal layer on the second alignment layer, the alignment of the ferroelectric liquid crystal can be controlled.

According to the present invention, by using the compounds as the reactive liquid crystal, even in the case the first alignment layer and the second alignment layer are the columnar alignment layers and they are disposed as mentioned above, the alignment of the ferroelectric liquid crystal can be controlled effectively. It is considered that according to the interaction of the compounds with the column structure of the second alignment layer, the anisotropy of the second alignment layer is provided to the reactive liquid crystal layer with the direction thereof changed.

The polymerizable liquid crystal monomer used in the present invention is preferably a diacrylate monomer among the above-mentioned examples. According to the diacrylate monomer, polymerization can be carried out easily while preferably maintaining the aligned state.

The above-mentioned polymerizable liquid crystal monomer may not show the nematic phase by itself. In the present invention, these polymerizable liquid crystal monomers may be used as a mixture of two or more kinds as mentioned above so that a composition mixture thereof, that is, a reactive liquid crystal may show the nematic phase.

Furthermore, according to the present invention, as needed, a photo polymerization initiating agent or a polymerization inhibiting agent may be added to the above-mentioned reactive liquid crystal. For example, at the time of polymerizing a polymerizable liquid crystal material by the electron beam irradiation, the photo polymerization initiating agent may not be needed, however, in the case of the polymerization used commonly by for example, the ultraviolet ray irradiation, in general a photo polymerization initiating agent is used for the promoting the polymerization.

As the photo polymerization initiating agent to be used in the present invention, a benzyl (it is also referred to as abibenzoyl), a benzion isobutyl ether, a benzion isopropyl ether, a benzophenone, a benzoyl benzoic acid, a methyl benzoyl benzoate, a 4-benzoyl-4'-methyl diphenyl sulfide, a benzyl methyl ketal, a dimethyl amino methyl benzoate, a 2-n-butoxy ethyl-4-dimethyl amino benzoate, a p-dimethyl amino isoamyl benzoate, a 3,3'-dimethyl-4-methoxy benzophenone, a methylobenzoyl formate, a 2-methyl-1-(4-(methyl thio)phenyl)-2-morpholino propane-1-on, a 2-benzyl-2-dimethyl amino-1-(4-morpholino phenyl)-butane-1-on, a 1-(4-dodecylphenyl)-2-hydroxy-2-methyl propane-1-on, a 1-hydroxy cyclohexyl phenyl ketone, a 2-hydroxy-2-methyl-1-phenyl propane-1-on, a 1-(4-isopropyl phenyl)-2-hydroxy-2-methyl propane-1-on, a 2-chloro thioxantone, a 2,4-diethyl thioxantone, a 2,4-diisopropyl thioxantone, a 2,4-dimethyl thioxantone, an isopropyl thioxantone, a 1-chloro-4-propoxy thioxantone, or the like can be presented. In addition to the photo polymerization initiating agent, a sensitizing agent may be added within a range of not deteriorating the object of the present invention.

The addition amount of such a photo polymerization initiating agent is in general 0.01 to 20% by weight, it is preferably 0.1 to 10% by weight, and more preferably in a range of 0.5 to 5% by weight so as to be added to the above-mentioned reactive liquid crystal.

(Reactive Liquid Crystal Layer)

The thickness of the reactive liquid crystal layer produced by fixing the reactive liquid crystal as mentioned above is preferably in a range of 1 to 1,000 nm, and it is more preferably in a range of 3 to 100 nm. In the case the reactive liquid crystal layer is thicker than the above-mentioned range, the anisotropy is generated excessively, and in the case it is thinner than the above-mentioned range, the predetermined anisotropy may not be obtained. Therefore, the thickness of the reactive liquid crystal layer may be determined based on the needed anisotropy.

Next, the method for forming the reactive liquid crystal layer will be explained. The reactive liquid crystal layer can be formed by coating a reactive liquid crystal layer coating solution including the above-mentioned reactive liquid crystal onto the second alignment layer and applying the alignment process so as to fix the aligned state of the above-mentioned reactive liquid crystal.

Moreover, a method of preliminarily forming a dry film, or the like and laminating the same onto the second alignment layer can also be used instead of coating the reactive liquid crystal layer coating solution, however, in the present invention, it is preferable to use the method of preparing a reactive liquid crystal coating solution by dissolving a reactive liquid crystal in a solvent, coating the same on the second alignment layer and removing the solvent because this is a method relatively simple in terms of the process.

The solvent used for the above-mentioned reactive liquid crystal layer coating solution is not particularly limited as long as it can dissolve the above-mentioned reactive liquid crystal, or the like without inhibiting the alignment ability of the columnar alignment layer. For example, one kind or two or more kinds of hydrocarbons such as a benzene, a toluene, a xylene, an n-butyl benzene, a diethyl benzene and a tetralin; ethers such as a methoxy benzene, a 1,2-dimethoxy benzene and a diethylene glycol dimethyl ether; ketones such as an acetone, a methyl ethyl ketone, a methyl isobutyl ketone, a cyclohexanone and a 2,4-pentanedion; esters such as an ethyl acetate, a propylene glycol monomethyl ether acetate, a propylene glycol monoethyl ether acetate and a γ-butyrolactone; amide based solvents such as a 2-pyrolidone, an N-methyl-2-pyrolidone, a dimethyl formamide and a dimethyl acetamide; halogen based solvents such as a chloroform, a dichloromethane, a carbon tetrachloride, a dichloroethane, a tetrachloroethane, a tritrichloroethylene, a tetrachloroethylene, a chlorobenzene, and an orthodichlorobenzene; alcohols such as a t-butyl alcohol, a diacetone alcohol, a glycerol, a monoacetin, an ethylene glycol, a triethylene glycol and a hexylene glycol; phenols such as a phenol and a parachloro phenol; cellosolves such as a methyl cellosolve, an ethyl cellosolve, a butyl cellosolve and an ethylene glycol monomethyl ether acetate can be used.

Moreover, by using only one kind of a solvent, the solubility of the above-mentioned reactive liquid crystal, or the like may be insufficient or the first alignment layer may be corroded as mentioned above. However, by using two or more kinds of the solvents as a mixture, the trouble can be avoided. Among the above-mentioned solvents, those preferable as a single solvent are the hydrocarbons and the glycol monoether acetate based solvents, and those preferable as a solvent mixture are a mixture of the ethers or the ketones and the glycol based solvents. Since the concentration of the reactive liquid crystal layer forming coating solution depends on the solubility of the reactive liquid crystal and the thickness of the reactive liquid crystal layer to be formed, it cannot be defined on the whole, however, it is prepared in general in a range of 1 to 60% by weight, and preferably in a range of 3 to 40% by weight.

Furthermore, to the above-mentioned reactive liquid crystal layer forming coating solution, the compounds as mentioned below can be added within a range of not deteriorating the purpose of the present invention. As the compounds to be added, for example, polyester(meth)acrylates obtained by reacting a polyester prepolymer obtained by the condensation of a polyhydric alcohol and a monobasic acid or a polybasic acid with a (meth)acrylic acid; polyurethane(meth)acrylates obtained by reacting a polyol group and a compound having two isocyanate groups with each other, and reacting the reaction product with a (meth)acrylic acid; photo polymerizable compounds such as an epoxy(meth)acrylate, obtained by reacting epoxy resins such as a bisphenol A type epoxy resin, a bisphenol F type epoxy resin, a novolak type epoxy resin, a polycarboxylic acid polyglycidyl ester, a polyol polyglycidyl ether, an aliphatic or alicyclic epoxy resin, an amine epoxy resin, a triphenol methane type epoxy resin and a dihydroxy benzene type epoxy resin with a (meth)acrylic acid; photo polymerizable liquid crystal compounds having an acrylic group or a methylacrylic group, or the like can be presented. The addition amount of these compounds to the above-mentioned reactive liquid crystal can be selected within a range of not deteriorating the purpose of the present invention. By adding these compounds, the hardening property of the reactive liquid crystal can be improved so that the mechanical strength of the reactive liquid crystal layer to be obtained can be increased and furthermore, the stability thereof can be improved.

AS a method for coating such a reactive liquid crystal layer forming coating solution, a spin coating method, a roll coating method, a printing method, a dip coating method, a curtain coating method (die coating method), a casting method, a bar coating method, a blade coating method, a spray coating method, a gravure coating method, a reverse coating method, a extruding coating method, or the like can be presented.

Moreover, after coating the above-mentioned reactive liquid crystal layer forming coating solution, the solvent is removed, and the solvent removal can be carried out, for example, by the reduced pressure removal or the heating removal, of furthermore, a method as a combination thereof, or the like.

According to the present invention, as mentioned above, the coated reactive liquid crystal is aligned by the columnar alignment layer so as to be in a state having the liquid crystal regularity. That is, the reactive liquid crystal comes to have the nematic phase. This is carried out in general by a method of the heat treatment to the N-I transition point or lower, or the like. Here, the "N-I transition point" denotes the temperature of the transition from the liquid crystal phase to the isotropic phase.

The reactive liquid crystal used in the present invention has a polymerizable liquid crystal material. In order to fix the aligned state of such a polymerizable liquid crystal material, a method of directing an activating radiation for activating the polymerization is used. The "activating radiation" here is the radiation having the ability of inducing the polymerization to the polymerizable liquid crystal material. As needed, a photo polymerization initiating agent may be included in the polymerizable liquid crystal material.

The activating radiation is not particularly limited as long as it is a radiation capable of polymerizing the polymerizable liquid crystal material. In general, from the viewpoint of the device easiness, or the like, an ultraviolet ray or a visible light beam is used. An irradiation beam having a wavelength of 150 to 500 nm, preferably 250 to 450 nm, further preferably 300 to 400 nm is used.

According to the present invention, a method of directing an ultraviolet ray as the activating radiation to a polymerizable liquid crystal material to have the radical polymerization by generating a radical by the photo polymerization initiating agent with an ultraviolet ray is a preferable method. Since the method of using an ultraviolet ray as the activating radiation is a technique already established, it can be applied easily to the present invention including the photo polymerization initiating agent.

As the light source of the irradiating light beam, a low pressure mercury lamp (a germicidal lamp, a fluorescent chemical lamp, a black light), a high pressure discharge lamp (a high pressure mercury lamp, a metal halide lamp), a short arc discharge lamp (an ultra high pressure mercury lamp, a xenon lamp, a mercury xenon lamp), or the like can be presented as the examples. In particular, use of a metal halide lamp, a xenon lamp, a high pressure mercury lamp, or the like can be recommended. Moreover, the irradiation strength is adjusted optionally according to the composition of the reactive liquid crystal and the amount of the photo polymerization initiating agent.

The irradiation of such an activating radiation can be carried out by the temperature condition to have the above-mentioned polymerizable liquid crystal in a liquid crystal phase, or at a temperature lower than the temperature to have the liquid crystal phase. The polymerizable liquid crystal material once had the liquid crystal phase would not have the sudden disturbance of the aligned state even in the case the temperature is lowered thereafter.

As a method for fixing the aligned state of the polymerizable liquid crystal material, in addition to the above-mentioned method of directing the activating radiation, a method of polymerizing the polymerizable liquid crystal material by heating can be used as well.

c. Second Substrate

The second substrate used in the present invention is not particularly limited as long as it is one commonly used as the substrate for the liquid crystal display. For example, a glass plate, a plastic plate, or the like can be presented preferably. The surface roughness (RSM value) of the substrate used in the present invention is preferably 10 nm or less, it is more preferably 3 nm or less, and it is further preferably in a range of 1 nm or less. The above-mentioned surface roughness is the value measured using an atomic force microscope (AFM).

d. Second Electrode Layer

The second electrode layer used in the present invention is for driving the ferroelectric liquid crystal by applying a signal voltage to the ferroelectric liquid crystal.

The second electrode layer is not particularly limited as long as it is one commonly used as the electrode layer of the liquid crystal display, and it is preferable that at least one of the first electrode layer and the second electrode layer is made of a transparent conductive material. As the transparent conductive material, an indium oxide, a tin oxide, an indium tin oxide (ITO), or the like can be presented preferably.

For example, in the case the liquid crystal display of the present invention is of the active matrix drive using the TFT element, it is preferable that one of the first electrode layer and the second electrode layer is an entire surface common electrode made of the transparent conductive material and the other one comprises the x electrodes and the y electrodes arranged in a matrix so as to dispose the TFT element and the pixel electrode in the portions surrounded by the x electrodes and the y electrodes.

Out of these electrodes, the transparent conductive film to provide the entire surface common electrode can be formed on the substrate by the deposition method such as the CVD method, the sputtering method and the ion plating method. Moreover, the x electrodes and the y electrodes can be formed by forming a conductive film of a metal such as a chromium and an aluminum by the deposition method and patterning the same into a matrix. As the patterning method, a common method such as the photolithography method can be used.

(2) First Alignment Substrate

Next, the first alignment substrate used in the present invention will be explained. In the present invention, the first alignment substrate comprises a first substrate, a first electrode layer formed on the first substrate, and a first alignment layer formed on the first electrode layer. Since the first substrate and the first electrode layer used for the first alignment substrate are same as those explained in the column for the second alignment substrate and the second electrode layer of the second alignment substrate, explanation is not repeated here. Hereinafter, the first alignment layer and the other configurations will be explained.

a. First Alignment Layer

The first alignment layer used in the present invention is not particularly limited as long as it can align the ferroelectric liquid crystal and thus those commonly used as the alignment layer for the liquid crystal display can be used. For example, a rubbing alignment layer, a photo alignment layer, an alignment layer using plate-like molecule, or the like can be presented. Among these examples, it is preferable that the first alignment layer in the present invention is an alignment layer using plate-like molecule, and it is more preferably an alignment layer having a column structure with the plate-like molecule laminated with the normal direction thereof aligned in a certain direction. Since such a first alignment layer is formed, utilizing the self organization of the above-mentioned plate-like molecule, it is advantageous in that the production process is simple and the apparatus cost can be reduced. Moreover, according to the liquid crystal display of the present invention, since the gap between the first alignment layer as the alignment layer having the column structure and the reactive liquid crystal layer is filled with the ferroelectric liquid crystal, according to the interaction of the ferroelectric liquid crystal and these functional layers, generation of the alignment defects such as the double domains can be prevented so that the mono-domain alignment of the ferroelectric liquid crystal can easily be obtained.

In the case the first alignment layer used in the present invention is an alignment layer having the column structure with the plate-like molecule laminated with the normal direction thereof aligned in a certain direction, the normal direction of the plate-like molecule of the first alignment layer and the alignment direction of the reactive liquid crystal of the reactive liquid crystal layer are disposed substantially parallel. According to the arrangement, the ferroelectric liquid crystal can be aligned along the normal direction of the plate-like molecule of the first alignment layer and the alignment direction of the reactive liquid crystal of the reactive liquid crystal layer.

The plate-like molecule used for the first alignment layer may either be those having the photo dichroism in the visible light range or those not having the photo dichroism, however, they are preferably those having the photo dichroism. Moreover, at the time, it is preferable that the first alignment layer is a columnar alignment layer mentioned above. Thereby, since the first alignment layer is a columnar alignment layer having the alignment function and the polarizing function, compared with the case of separately providing the polarizing plate, scattering of the light beam generated at the interface of the polarizing plate and the other functional layers can be better solved so that the deterioration of the light transmittance can be restrained. Furthermore, since the columnar alignment layer having the polarizing function (first alignment layer) is formed inside the first substrate so as not to suffer the influence of the birefringence of the first substrate, the selection range of the material used for the first substrate can be widened so that a plastic substrate having the birefringence can also be used, and thus a thin shape and a light weight of the liquid crystal display can be achieved. Still further, since the columnar alignment layer has the alignment function and the polarizing function, there is no need of separately forming the polarizing plate and the alignment layer, the manufacturing method of the liquid crystal display can be simplified. These can lead to also the production cost cutback of the liquid crystal display.

In the case the first alignment layer used in the present invention is a columnar alignment layer mentioned above, since the liquid crystal display of the present invention is for the visualization utilizing the polarizing function of the columnar alignment layer, the normal direction of the plate-like molecule of the first alignment layer (columnar alignment layer) and the normal direction of the plate-like molecule of the second alignment layer (columnar alignment layer) are disposed substantially perpendicularly.

The "substantially perpendicular" here denotes the angle θ formed by the normal direction of the plate-like molecule of the first alignment layer (columnar alignment layer) and the normal direction of the plate-like molecule of the second alignment layer (columnar alignment layer) is in a range of 90°±5°, and it is preferable that the angle θ is in a range of 90°±1°.

In the case the columnar alignment layers are arranged accordingly, the axial direction of the column structure of the first alignment layer and the axial direction of the column structure of the second alignment layer have the substantially perpendicular relationship. On the other hand, since the ferroelectric liquid crystal tends to be aligned in the axial direction of the column structure, according to the present invention, by forming the reactive liquid crystal layer on the second alignment layer for providing the anisotropy of the second alignment layer with the direction thereof changed, the alignment function of the columnar alignment layer can be performed more effectively with the arrangement via the reactive liquid crystal layer.

Since the columnar alignment layer is same as that explained in the column of the second alignment layer of the second alignment substrate, explanation is not repeated here.

b. Polarizing Layer

In the present invention, in the case a layer having the polarizing function is not provided in the first alignment substrate, a polarizing layer can be provided to the first alignment substrate. The polarizing layer used in the invention is not limited to any especial kind if the layer is a layer for transmitting only a specific direction of wave motions of light. It is possible to use a layer which is generally used as a polarizing layer for liquid crystal display. In the case such a polarizing layer is provided, the optical axis of the polarizing layer and the normal direction of the plate-like molecule of the second alignment layer (columnar alignment layer) are disposed substantially perpendicularly.

On the other hand, in the case the first alignment layer is a columnar alignment layer having the polarizing function, such a polarizing layer needs not be provided.

(3) Liquid Crystal Layer

Next, the liquid crystal layer used in the present invention will be explained. The liquid crystal layer used in the present invention comprises a ferroelectric liquid crystal filled between the first alignment substrate and the second alignment substrate.

(Ferroelectric Liquid Crystal)

The ferroelectric liquid crystal used for the liquid crystal layer is not particularly limited as long as it shows the chiral smectic C (SmC*) phase. A material having the phase change of the cholesteric (Ch) phase-smectic A (SmA) phase-chiral smectic C (SmC*) phase in the temperature cooling process can also be used. Furthermore, a material having the phase change of the Ch phase-SmC* phase without transition to the SmA phase can also be used. In particular, as the ferroelectric liquid crystal used in the present invention, one showing the latter phase transition sequence without the transition to the SmA phase is preferable. A ferroelectric liquid crystal showing such a phase transition sequence tends to show the mono-stability driving characteristic, and by using such a material showing the mono-stability driving characteristic, the graduation display is enabled so that a highly precise liquid crystal display for the color display can easily be obtained.

In the case the liquid crystal display of the present invention is driven by the field sequential color system, among the ferroelectric liquid crystals showing the mono-stability driving characteristic as mentioned above, it is preferable to use a ferroelectric liquid crystal of the half-V-shaped drive with the liquid crystal molecules operated only at the time either a positive voltage or a negative voltage is applied. By using a ferroelectric liquid crystal having such characteristics, the aperture time of the black and white shutter can be made longer so that a liquid crystal display of the bright color display can be obtained.

Moreover, the ferroelectric liquid crystal used in the invention is preferably one constituting a single phase. The word "constituting a single phase" means that a polymer network, as formed by the polymer stabilization method or the like, is not formed. Such use of the ferroelectric liquid crystal of a single phase makes it possible to simplify the production process and lowering the driving voltage.

As it will be described later, a polymer network may be formed in the liquid crystal layer used in the present invention.

As the specific examples of such a ferroelectric liquid crystal, "R2301", "FELIX-3206" commercially available from AZ Electronic Materials can be presented.

(Liquid Crystal Layer)

The thickness of the liquid crystal layer used in the invention is preferably from 1.2 μm to 3.0 μm, more preferably from 1.3 μm to 2.5 μm, even more preferably from 1.4 μm to 2.0 μm. If the thickness of the liquid crystal layer is too thin, the contrast may lower. Conversely, if the thickness is too thick, the liquid crystal may not be aligned with ease.

As the method for forming the liquid crystal, a method which is generally used as a method for forming a liquid crystal cell can be used. For example, the liquid crystal layer can be formed, by making use of capillary effect to inject an isotropic liquid obtained by heating the above-mentioned ferroelectric liquid crystal into a liquid crystal cell, which is formed by forming electrodes beforehand on a substrate and arranging the above-mentioned columnar alignment layer and reactive liquid crystal layer, and then sealing the cell. The thickness of the liquid crystal layer can be adjusted with spacers such as beads.

According to the liquid crystal layer used in the present invention, a polymer network may be formed. That is, the liquid crystal layer may contain a polymerization product of a polymerizable monomer. Thereby, the sequence of the ferroelectric liquid crystal can further be stabilized.

The polymerizable monomer used for the polymerization product of the polymerizable monomer is not particularly limited as long as it is a compound capable of generating a polymerization product by the polymerization reaction. As such a polymerizable monomer, a thermosetting resin monomer capable of generating the polymerization reaction by the thermal treatment, and an active radiation curable resin monomer capable of generating the polymerization reaction by the irradiation of an active radiation can be presented. In particular, in the present invention, it is preferable to use an active radiation curable resin monomer. Since the thermosetting resin monomer requires the thermal treatment for generating the polymerization reaction, the regular sequence of the ferroelectric liquid crystal may be deteriorated or the phase transition may be induced by the thermal treatment. On the other hand, the active radiation curable resin monomer does not involve such a risk so that the sequence of the ferroelectric liquid crystal may hardly be deteriorated by the generation of the polymerization reaction.

As the active radiation curable resin monomer, an electron beam curable resin monomer capable of generating the polymerization reaction by the electron beam irradiation, and a photosetting resin monomer capable of generating the polymerization reaction by the light irradiation can be presented. In particular, according to the present invention, it is preferable to use a photosetting resin monomer. By using the photosetting resin monomer, the manufacturing method of the liquid crystal display of the present invention can be simplified.

The above-mentioned photosetting resin monomer is not particularly limited as long as it can generate the polymerization reaction by the irradiation of a light beam having the wavelength in a range of 150 nm to 500 µm. In particular, according to the present invention, it is preferable to use an ultraviolet ray curable resin monomer capable of generating the polymerization reaction by the irradiation of a light beam having the wavelength in a range of 250 nm to 450 nm, in particular, in a range of 300 nm to 400 nm because it is advantageous in terms of the irradiation device convenience, or the like.

The polymerizable functional group of the ultraviolet ray curable resin monomer is not particularly limited as long as it can generate the polymerization reaction by the irradiation of an ultraviolet ray of the wavelength range mentioned above. According to the present invention, it is preferable to use an ultraviolet ray curable resin monomer having an acrylate group.

The above-mentioned ultraviolet ray curable resin monomer may either be a monofunctional monomer having a polymerizable functional group in a molecule or a polyfunctional monomer having two or more polymerizable functional group in a molecule. In particular, according to the present invention, it is preferable to use a polyfunctional monomer. By using the polyfunctional monomer, since a stronger polymer network can be formed in the liquid crystal layer, the interatomic force and the polymer network at the first alignment layer interface can be reinforced. Therefore, by using the polyfunctional monomer, disturbance of the sequence of the ferroelectric liquid crystal by the temperature change of the liquid crystal layer can be restrained.

According to the present invention, among the polyfunctional monomers, a bifunctional monomer having a polymerizable functional group at both ends of the molecules is preferable. Since the functional groups on the both ends of the molecules, a polymer network with a wide interval between the polymers can be formed so that the decline of the driving voltage of the ferroelectric liquid crystal due to the presence of the polymerization product of the polymerizable monomers in the liquid crystal layer can be prevented.

According to the present invention, among the ultraviolet ray curable resin monomers, it is preferable to use a ultraviolet ray curable liquid crystal monomer capable of showing the liquid crystal property. Such an ultraviolet ray curable liquid crystal monomer is preferable for the following reasons. That is, since the ultraviolet ray curable liquid crystal monomer shows the liquid crystal property, it can be arranged regularly by the alignment limiting force of the first alignment layer or second alignment layer. Therefore, by generating the polymerization reaction after regularly arranging the ultraviolet ray curable liquid crystal monomers, they can be fixed while maintaining the regular arrangement state in the liquid crystal layer. Owing to the presence of the polymerization product having the regular arrangement state in the liquid crystal layer, the alignment stability of the ferroelectric liquid crystal can be improved so that the excellent heat resistance and impact resistance can be provided to the liquid crystal display of the present invention.

The liquid crystal phase shown by the ultraviolet ray curable liquid crystal monomer is not particularly limited. For example, the nematic phase, the SmA phase and the SmC phase can be presented.

As the ultraviolet ray curable liquid crystal monomers used in the present invention, for example, the compounds represented by the following formula can be presented.

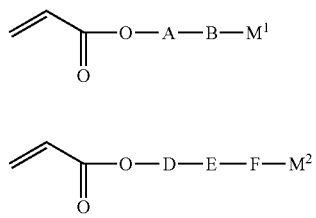

In the formula, A, B, D, E and F, which may have a substituent such as a halogen, represent a benzene, a cyclohexane or a pyrimidine. Moreover, A and B, or D and E may be coupled via a coupling group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group at the molecule chain end and A or D may be coupled via a spacer such as an alkylene group having 3 to 6 carbon atoms.

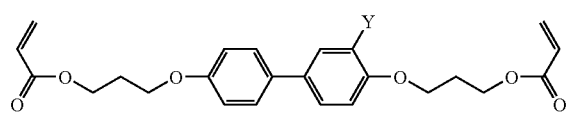

In the formula, Y represents hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro.

Among the compounds represented by the formulae, as the specific compounds to be used preferably in the present invention, the compounds of the following formulae can be presented.

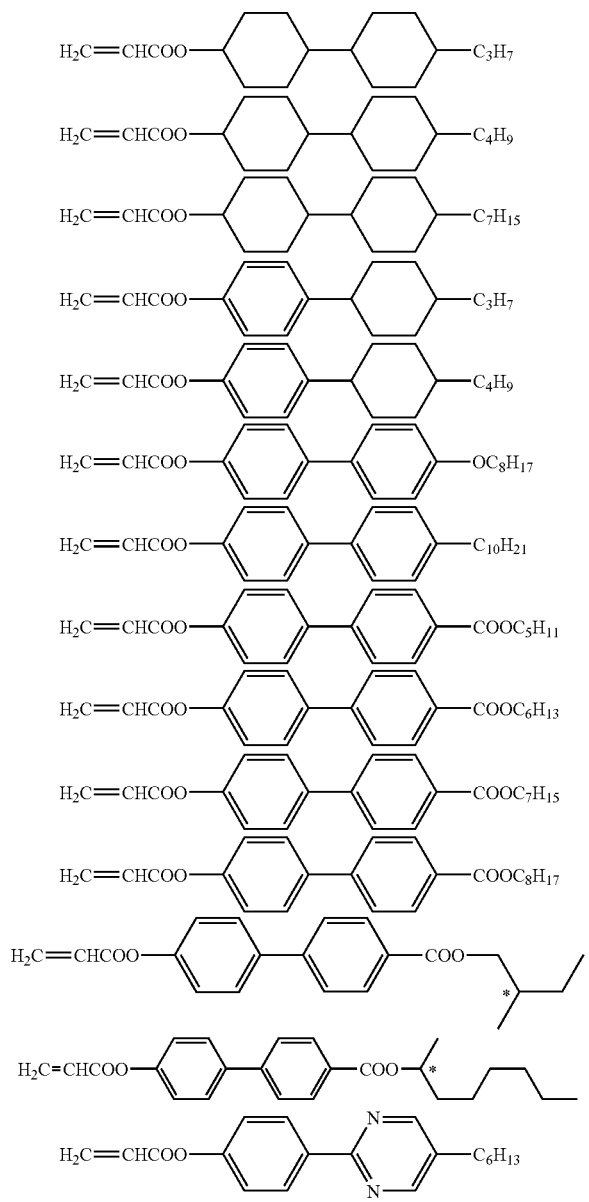

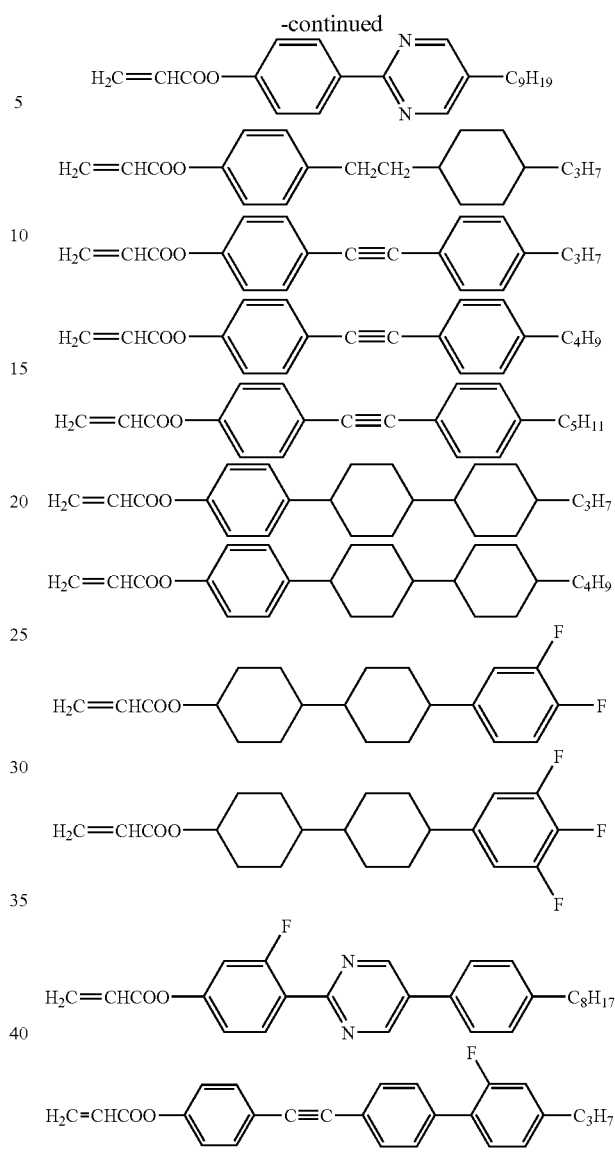

The polymerization product of the polymerizable monomers used in the present invention may either be a polymerization product of a single polymerizable monomer, or a polymerization product of two or more different polymerizable monomers. In the case of a polymerization product of two or more different polymerizable monomers, for example, a polymerization product of the ultraviolet ray curable liquid crystal monomer and another ultraviolet ray curable resin monomer can be presented.

In the case the ultraviolet ray curable liquid crystal monomer is used as the polymerizable monomer, a polymerization product of the polymerizable monomers used in the present invention may be a main chain liquid crystal polymer with the main chain showing the liquid crystal property owing to the presence of an atomic group showing the liquid crystal property in the main chain, moreover, it maybe a side chain liquid crystal polymer with the side chain showing the liquid crystal property owing to the presence of an atomic group showing the liquid crystal property in the side chain In particular, according to the present invention, it is preferably a side chain liquid crystal polymer. Since the degree of freedom of the atomic group can be higher owing to the presence of the atomic group showing the liquid crystal property in the side chain, the atomic group showing the liquid crystal property can easily be aligned in the liquid crystal layer. Moreover, consequently, the alignment stability of the ferroelectric liquid crystal in the liquid crystal layer can be improved.

The amount of the polymerization product of the polymerizable monomer present in the liquid crystal layer is not particularly limited as long as it is in a range capable of having the alignment stability of the ferroelectric liquid crystal to a desired degree. In general, it is preferably in a range of 0.5% by mass to 30% by mass in the liquid crystal player, in particular it is preferably in a range of 1% by mass to 20% by mass, and especially it is preferably in a range of 1% by mass to 10% by mass. In the case it is more than the range, increase of the driving voltage of the ferroelectric liquid crystal or the deterioration of the response speed may be brought about. Moreover, in the case it is less than the range, due to the insufficiency of the alignment stability of the ferroelectric liquid crystal, the heat resistance or the impact resistance of the liquid crystal display of the present invention may be deteriorated.

Here, the amount of the polymerization product of the polymerizable monomer present in the liquid crystal layer can be calculated from the residual amount found by measuring with an electronic force balance the weight of the polymerization product of the polymerizable monomer remaining after washing out the single molecule liquid crystals in the liquid crystal layer with a solvent and the total mass of the liquid crystal layer.

In the liquid crystal layer used in the present invention, another compound may be included within a range not deteriorating the purpose of the present invention. As such a compound, an unreacted polymerizable monomer, a photo polymerization initiating agent, a reaction initiating agent, a reaction inhibiting agent, or the like can be presented.

(4) Manufacturing Method of the Liquid Crystal Display

Next, the manufacturing method of the liquid crystal display of the present invention will be explained. As the manufacturing method of the liquid crystal display of the present invention, a method commonly known as a manufacturing method of the liquid crystal display can be used, and thus it is not particularly limited.

As an example of the manufacturing method of the liquid crystal display of the present invention, the case of providing an active matrix system liquid crystal display using the TFT element will be explained.

First, a transparent conductive film is formed by the deposition method mentioned above on the first substrate so as to provide the entire surface common electrode. On the other hand, a switching element and a pixel electrode are provided onto the second substrate by patterning a conductive film in a matrix so as to form an x electrode and a y electrode.

On the electrode layer formed on the first substrate, a columnar alignment layer is formed by the method so as to provide the first alignment substrate. On the other hand, on the electrode layer formed on the second substrate, a columnar alignment layer is formed in the same manner, and furthermore, a reactive liquid crystal layer is formed on the columnar alignment layer so as to provide the second alignment substrate.

With beads dispersed as a spacer on one of the first alignment substrate and the second alignment substrate accordingly formed and a sealing material coated on the circumference of the other, the first alignment substrate and the second alignment substrate are attached such that the columnar alignment layer of the first alignment substrate and the reactive liquid crystal layer of the second alignment substrate face with each other so as to be thermally pressed. After the thermal pressing operation, the ferroelectric liquid crystal is heated and injected in an isotropic phase or nematic phase state, utilizing the capillary effect from the injection opening, and the injection opening is sealed. Thereafter, the ferroelectric liquid crystal is aligned by gradually cooling down the same. Accordingly, a liquid crystal display of the present invention can be manufactured.

Moreover, according to the present invention, the liquid crystal display can be produced using the polymer stabilization method. In this case, a liquid crystal layer can be formed by a liquid crystal sealing process of sealing a liquid crystal layer forming composition including a ferroelectric liquid crystal and a polymerizable monomer between the first alignment substrate and the second alignment substrate, a liquid crystal alignment process of having the ferroelectric liquid crystal in the chiral smectic C phase state, and a polymerizing process of polymerizing the polymerizable monomer with the ferroelectric liquid crystal in the chiral smectic C phase.

In the liquid crystal sealing process, the method of sealing the liquid crystal layer forming composition including the ferroelectric liquid crystal and the polymerizable monomer is not particularly limited. For example, it can be sealed by heating the liquid crystal layer forming composition so as to process the ferroelectric liquid crystal in the liquid crystal layer forming composition into an isotropic liquid, and injecting the same utilizing the capillary effect from the injection opening of a liquid crystal cell produced preliminarily using the first alignment substrate and the second alignment substrate. In this case, the injection opening is sealed with an adhesive.

At the time, the amount of the polymerizable monomer included in the liquid crystal layer forming composition can be determined optionally according to the amount necessary for the sequence stabilization of the ferroelectric liquid crystal after the formation or the liquid crystal layer. In particular, according to the present invention, it is preferably in a range of 0.5% by mass to 30% by mass in the liquid crystal layer forming composition, it is particularly preferably in a range of 1% by mass to 20% by mass, and it is especially preferably in a range of 1% by mass to 10% by mass. In the case the polymerizable monomer content is more than the range, the liquid crystal layer performance may be deteriorated due to the high driving voltage of the ferroelectric liquid crystal after the formation of the liquid crystal layer. Moreover, in the case it is lower than the range, as a result of the insufficient sequence stabilization of the ferroelectric liquid crystal, the heat resistance, the impact resistance, or the like of the liquid crystal display can be lowered.

Moreover, at the time of sealing the liquid crystal layer forming composition, the ferroelectric liquid crystal is heated to the transition temperature from the chiral smectic C phase to the nematic phase or higher. The temperature may be the transition temperature or higher from the chiral smectic C phase to the nematic phase. In general, the ferroelectric liquid crystal is heated into the state of the isotropic phase or the nematic phase. As to the specific temperature, it differs depending on the kind of the ferroelectric liquid crystal, and thus it can be selected optionally.

Next, in the liquid crystal alignment process, the sealed ferroelectric liquid crystal is cooled down. At the time, in general the ferroelectric liquid crystal is cooled down gradually to the room temperature (about 25° C.)

Moreover, in the polymerizing process, the method for polymerizing the polymerizable monomer can be determined optionally according to the kind of the polymerizable monomer. For example, in the case an ultraviolet ray curable resin monomer is used as the polymerizable monomer, polymerization can be carried oat by the ultraviolet ray irradiation.

The polymerizable monomer can be polymerized either in a state with the voltage applied to the liquid crystal layer or in a state without the voltage application. In the present invention, it is preferable to carry out the polymerization in a state without the voltage application because the production process can be simplified further by the polymerization without the voltage application.

(5) Liquid Crystal Display

Since the liquid crystal display of the present invention uses the columnar alignment layer having the alignment function and the polarizing function as the second alignment layer, and preferably also as the first alignment layer, compared with the case of separately providing the polarizing plate, the light scattering generated at the interface between the polarizing plate and the other functional layers can be better solved, and thereby the deterioration of the light transmittance can be restrained.

Moreover, since the columnar alignment layer having the polarizing function is formed inside the second substrate so as not to suffer the influence of the birefringence of the second substrate, a plastic substrate having the birefringence can also be used as the second substrate so that a thin shape and a light weight of the liquid crystal display can be achieved, and furthermore, it leads to the cutback of the production cost.

Since the columnar alignment layer used in the present invention is formed, utilizing the self organization of the plate-like molecule, it can be formed by a simple method without the need of the alignment process such as the rubbing process and the photo alignment process, and thus the liquid crystal display of the present invention is highly practical.

Moreover, according to the liquid crystal display of the present invention, since the ferroelectric liquid crystal is interposed between the first alignment layer and the reactive liquid crystal layer, generation of the alignment defect such as the double domains can be restrained so that the mono-domain alignment of the ferroelectric liquid crystal can easily be obtained. Thus, the liquid crystal display of the present invention enables the graduation display and can be used as a highly precise color liquid crystal display.

The liquid crystal display of the invention is suitable for color liquid crystal display since it is driven by the color filter system or the field sequential color system. Among them, it is preferred to drive the liquid crystal display of the invention by the field sequential color system. The field sequential color system is for enabling the color display by switching on or off the liquid crystal synchronously with flickering of the LED of the three colors of red, green and blue without the use of a color filter. Thereby, a bright, highly precise color moving image display can be realized with a low power consumption, a low cost and a wide view angle. By using a material undergoing half-V-shaped driving, in which liquid crystal molecules thereof work only when either one of positive and negative voltages is applied thereto, it is possible to make light leakage less when dark regions operate (when a black and white shutter is closed), and make the aperture time of the black and white shutter sufficiently long. This makes it possible to display respective colors switched with time more brightly to realize bright color liquid crystal display.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

Hereinafter, the present invention will be explained in further details with reference to the examples.

Example 1

As the reactive liquid crystal, the below-mentioned compound (A) was used

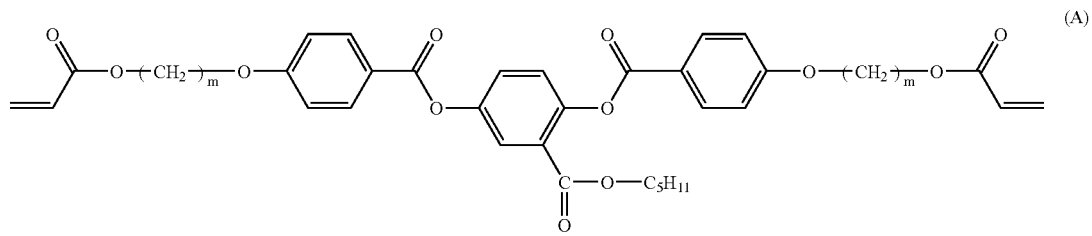

(A)

(Production of the First Alignment Substrate)

By coating with a die coater, an ink containing the plate-like molecule having the photo dichroism in the visible light range (produced by Optiva, Inc., N015) onto the ITO film of a glass substrate having an ITO electrode, washed well, and drying, it was soaked in a 15% barium chloride aqueous solution for about 1 second. By further washing and drying again, a first alignment substrate having a 0.3 μm thickness columnar alignment layer was obtained.

(Production of the Second Alignment Substrate)

A 0.3 μm thickness columnar alignment layer was formed on the ITO film of a glass substrate having an ITO electrode, washed well by the method mentioned above. Then, a solution produced by dissolving in a cyclopentanone the compound (A) to have the 2% by weight concentration was spin coated onto the columnar alignment layer by 4,000 rpm for 30 seconds. After drying at 55° C. for 3 minutes, a 1,000 mJ/cm² non polarized ultraviolet ray was irradiated for forming a reactive liquid crystal layer so as to obtain a second alignment substrate, (Formation of the Liquid Crystal Layer)

With 1.5 μm diameter bead spacer scattered on the columnar alignment layer of the first alignment substrate and a sealing material coated on the reactive liquid crystal layer of the second alignment substrate using a seal dispenser, the first alignment substrate and the second alignment substrate were attached in a state disposed such that the polarization direction of the columnar alignment layer of the first alignment substrate and the polarizing direction of the columnar alignment layer of the second alignment substrate were orthogonal with each other and the columnar alignment layer and the reactive liquid crystal layer face with each other. By carrying out the thermal pressing at 150° C. for about 1 hour, a test cell was produced. By injecting a ferroelectric liquid crystal (produced by AZ Electronic Materials, R2301) into the test cell by the about 100° C. temperature condition and cooling down the same gradually, a mono domain even alignment was obtained.

Example 2

(Formation of the Concave Part Pattern)

An ultraviolet ray curable acrylate resin of the below-mentioned composition was spin coated onto a glass substrate having an ITO electrode, washed well. With a concave part forming substrate having the ruggedness formed by the electron beam drawing method placed thereon, a 100 kg/cm² load was applied for 1 minute. After directing an ultraviolet ray by 100 mJ/cm² in this state and removing the concave part forming substrate, an ultraviolet ray was directed by 3,000 mJ/cm² so as to form a concave part pattern in a stripe form having a 0.2 μm width, a 0.4 μm pitch and a 0.2 μm depth. By applying the plasma process thereto, the hydrophilic process was carried out on the surface.

| (Composition of the ultraviolet ray curable acrylate resin) | |
| --- | --- |
| Gohselac UV-7500B (produced by Nippon Synthetic Chemical Industry Co., Ltd.) | 40 parts by weight |
| 1,6-hexane diol acrylate (produced by NIPPON KAYAKU CO., LTD) | 35 parts by weight |
| Pentaerythritol acrylate (produced by TOAGOSEI Co., Ltd.) | 21 parts by weight |
| 1-hydroxy cyclohexyl phenyl ketone (produced by Chiba Speciality Chemicals) | 2 parts by weight |
| Benzo phenone (produced by NIPPON KAYAKU CO., LTD) | 2 parts by weight |

(Production of the First Alignment Substrate)

After coating an ink containing the plate-like molecule having the photo dichroism in the visible light range (produced by Optiva, Inc., N015) onto the concave pattern produced by the method using the ink jet and drying, it was soaked in a 15% barium chloride aqueous solution for about 1 second. By further washing and drying the same again so as to form a columnar alignment layer with a 0.3 μm thickness of the portion with the column structure formed, a first alignment substrate was obtained.

(Production of the Second Alignment Substrate)

Using the concave part pattern produced by the method, a columnar alignment layer with a 0.3 μm thickness of the portion with the column structure formed was formed by the method. By forming a reactive liquid crystal layer on the columnar alignment layer in the same manner as in the example 1, a second alignment substrate was obtained.

(Formation of the Liquid Crystal Layer)

With 1.5 μm diameter bead spacer scattered on the columnar alignment layer of the first alignment substrate and a sealing material coated on the reactive liquid crystal layer of the second alignment substrate using a seal dispenser, the first alignment substrate and the second alignment substrate were attached in a state disposed such that the polarization direction of the columnar alignment layer of the first alignment substrate and the polarizing direction of the columnar alignment layer of the second alignment substrate were orthogonal with each other and the columnar alignment layer and the reactive liquid crystal layer face with each other. By carrying out the thermal pressing at 150° C. for about 1 hour, a test cell was produced. By injecting a ferroelectric liquid crystal (produced by AZ Electronic Materials, R2301) into the test cell by the about 100° C. temperature condition and cooling down the same gradually, a mono domain even alignment was obtained.

Example 3

With the same conditions as in the example 1, a test cell was produced. A liquid crystal prepared by mixing 5% by mass of a polymerizable monomer (produced by DAINIPPON INK AND CHEMICALS, Inc. UCL-001) to a ferroelectric liquid crystal (produced by AZ Electronic Materials, R2301) was injected into the test cell by the about 100° C. temperature condition and cooled down the same gradually. Thereafter, by the exposure with a non polarized ultraviolet ray by about 1,000 mJ/cm², the polymerizable monomer was polymerized. In the liquid crystal display obtained accordingly, a mono domain even alignment was obtained.

What is claimed is:

1. A liquid crystal display comprising a first alignment substrate having a first substrate, a first electrode layer formed on the first substrate and a first alignment layer formed on the first electrode layer, and a second alignment substrate having a second substrate, a second electrode layer formed on the second substrate, a second alignment layer formed on the second electrode layer, and a reactive liquid crystal layer formed on the second alignment layer, produced by fixing a reactive liquid crystal including a polymerizable liquid crystal material and showing a nematic phase;

disposed such that the first alignment layer and the reactive liquid crystal layer face with each other, with a ferroelectric liquid crystal interposed between the first alignment substrate and the second alignment substrate;

wherein the second alignment layer has a column structure with a plate-like molecule having a photo dichroism in a visible light range laminated with a normal direction of the plate-like molecule aligned in a certain direction, and it is a columnar alignment layer having an alignment function and a polarizing function.

2. The liquid crystal display according to claim 1, wherein the first alignment layer is the columnar alignment layer, and the normal direction of the plate-like molecule of the first alignment layer and the normal direction of the plate-like molecule of the second alignment layer are disposed substantially perpendicularly.

3. The liquid crystal display according to claim 2, wherein the columnar alignment layer comprises a resin layer with a concave part or a convex part having a predetermined width formed on a surface in a pattern, and the column structure formed along the concave part of the resin layer.

4. The liquid crystal display according to claim 2, wherein the plate-like molecule shows a lyotropic liquid crystal phase in an aqueous solution.

5. The liquid crystal display according to claim 2, wherein the ferroelectric liquid crystal shows a mono-stability driving characteristic.

6. The liquid crystal display according to claim 2, wherein the ferroelectric liquid crystal shows a phase transition sequence without a smectic A phase in a temperature cooling process.

7. The liquid crystal display according to claim 2, comprising a thin film transistor in the first electrode layer or the second electrode layer, and it is driven by an active matrix drive.

8. The liquid crystal display according to claim 2, driven by a field sequential color system.

9. The liquid crystal display according to claim 1, wherein the columnar alignment layer comprises a resin layer with a concave part or a convex part having a predetermined width formed on a surface in a pattern, and the column structure formed along the concave part of the resin layer.

10. The liquid crystal display according to claim 1, wherein the plate-like molecule shows a lyotropic liquid crystal phase in an aqueous solution.

11. The liquid crystal display according to claim 1, wherein the ferroelectric liquid crystal shows a mono-stability driving characteristic.

12. The liquid crystal display according to claim 1, wherein the ferroelectric liquid crystal shows a phase transition sequence without a smectic A phase in a temperature cooling process.

13. The liquid crystal display according to claim 1, comprising a thin film transistor in the first electrode layer or the second electrode layer, and it is driven by an active matrix drive.

14. The liquid crystal display according to claim 1, driven by a field sequential color system.

* * * * *